United States Patent
Shajii et al.

(10) Patent No.: US 6,932,098 B2
(45) Date of Patent: *Aug. 23, 2005

(54) APPARATUS AND METHOD FOR PRESSURE FLUCTUATION INSENSITIVE MASS FLOW CONTROL

(75) Inventors: Ali Shajii, Canton, MA (US); Nicholas Kottenstette, Newburyport, MA (US); Jesse Ambrosina, Topsfield, MA (US); Donald K. Smith, Belmont, MA (US); William R. Clark, Hampstead, NH (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,974

(22) Filed: Mar. 23, 2004

(65) Prior Publication Data

US 2004/0256003 A1 Dec. 23, 2004

Related U.S. Application Data

(63) Continuation of application No. 10/178,721, filed on Jun. 24, 2002, now Pat. No. 6,712,084.

(51) Int. Cl.[7] .................................................. G05D 7/06
(52) U.S. Cl. ...................... 137/12; 137/486; 137/487.5; 137/599.13
(58) Field of Search .......................... 137/12, 14, 486, 137/487.5

(56) References Cited

U.S. PATENT DOCUMENTS

| 4,285,245 A | 8/1981 | Kennedy |
| 5,062,446 A | 11/1991 | Anderson |
| 5,201,581 A | 4/1993 | Vander et al. |
| 5,684,245 A | 11/1997 | Hinkle |
| 5,765,283 A | 6/1998 | Mudd |
| 5,805,442 A | 9/1998 | Crater et al. |
| 5,850,850 A | 12/1998 | Mudd et al. |
| 5,911,238 A | 6/1999 | Bump et al. |
| 5,925,829 A | 7/1999 | Laragione et al. |
| 5,944,048 A | 8/1999 | Bump et al. |
| 5,975,126 A | 11/1999 | Bump et al. |
| 6,061,603 A | 5/2000 | Papadopoulos et al. |
| 6,151,625 A | 11/2000 | Swales et al. |
| 6,247,495 B1 | 6/2001 | Yamamoto et al. |
| 6,321,272 B1 | 11/2001 | Swales |
| 6,332,348 B1 | 12/2001 | Yelverton et al. |
| 6,333,272 B1 | 12/2001 | McMillin et al. |
| 6,343,617 B1 | 2/2002 | Tinsley et al. |
| 6,450,200 B1 | 9/2002 | Ollivier |
| 6,640,140 B1 | 10/2003 | Lindner et al. |
| 6,712,084 B2 * | 3/2004 | Shajii et al. .................. 137/12 |

\* cited by examiner

Primary Examiner—Ramesh Krishnamurthy
(74) Attorney, Agent, or Firm—McDermott Will & Emery LLP

(57) ABSTRACT

A mass flow controller includes a thermal mass flow sensor in combination with a pressure sensor to provide a mass flow controller that is relatively insensitive to fluctuations in input pressure. The pressure sensor and thermal sensor respectively provide signals to an electronic controller indicating the measured inlet flow rate and the pressure within the dead volume. The electronic controller employs the measured pressure to compensate the measured inlet flow rate and to thereby produce a compensated measure of the outlet flow rate, which may be used to operate a mass flow controller control valve.

18 Claims, 18 Drawing Sheets

Calibration Gas: N2

| | % Full Scale | Cal Point |
|---|---|---|
| 1 | 0 | 0 |
| 2 | 5 | 0 |
| 3 | 10 | 0 |
| 4 | 15 | 0 |
| 5 | 20 | 0 |
| 6 | 25 | 0 |
| 7 | 30 | 0 |
| 8 | 35 | 0 |
| 9 | 40 | 0 |
| 10 | 45 | 0 |
| 11 | 50 | 0 |
| 12 | 55 | 0 |
| 13 | 60 | 0 |
| 14 | 65 | 0 |
| 15 | 70 | 0 |
| 16 | 75 | 0 |
| 17 | 80 | 0 |
| 18 | 85 | 0 |
| 19 | 90 | 0 |
| 20 | 100 | 0 |

Load File  Save  Download  Upload

Close Window

FIG. 13E

APPARATUS AND METHOD FOR PRESSURE FLUCTUATION INSENSITIVE MASS FLOW CONTROL

RELATED APPLICATIONS

This application is a continuation of the following applications: U.S. Ser. No. 10/178,721 filed Jun. 24, 2002, now U.S. Pat. No. 6,712,084, entitled Apparatus And Method For Pressure Fluctuation Insensitive Mass Flow Control and filed in the name of Jesse Ambrosina, Nicholas Kottenstette and Ali Shajii; U.S. Ser. No. 10/178,119, entitled Apparatus And Method for Calibration Of Mass Flow Controller and filed in the name of Jesse Anibrosina, Nicholas Kottenstette and Ali Shajii; U.S. Ser. No. 10/178,378, entitled Apparatus And Method For Self-Calibration OF Mass Flow Controller and filed in the name of Jesse Ambrosina, Nicholas Kottenstette, Ali Shajii and Donald Smith; U.S. Ser. No. 10/178,884, entitled Apparatus And Method For Mass Flow Controller With Network Access To Diagnostics and filed in the name of Jesse Ambrosina, Nicholas Kottenstette and Ali Shajii; U.S. Ser. No. 10/178,586, entitled Apparatus And Method For Displaying Mass Flow Controller Pressure and filed in the name of Jesse Ambrosina, Nicholas Kottenstette and Ali Shajii; U.S. Ser. No. 10/178,752, entitled Apparatus And Method For Dual Processor Mass Flow Controller and filed in the name of Jesse Ambrosina, Nicholas Kottenstette and Ali Shajii; U.S. Ser. No. 10/178,810, entitled Apparatus And Method For Mass Flow Controller With Embedded Web Server and filed in the name of Jesse Ambrosina, Nicholas Kottenstette and Ali Shajii; U.S. Ser. No. 10/178,288, entitled Apparatus And Method For Mass Flow Controller With On-Line Diagnostics and filed in the name of Jesse Ambrosina, Nicholas Kottenstette and Ali Shajii; U.S. Ser. No. 10/178,261, entitled Apparatus And Method For Mass Flow Controller With A Plurality Of Closed Loop Control Code Sets and filed in the name of Jesse Ambrosina, Nicholas Kottenstette and Ali Shajii, all filed Jun. 24, 2002, and assigned to the present assignee.

FIELD OF THE INVENTION

The present invention relates to mass flow sensing and control systems.

BACKGROUND OF THE INVENTION

Capillary tube thermal mass flow sensors exploit the fact that heat transfer to a fluid flowing in a laminar tube from the tube walls is a function of mass flow rate of the fluid, the difference between the fluid temperature and the wall temperature, and the specific heat of the fluid. Mass flow controllers employ a variety of mass flow sensor configurations. For example, one type of construction involves a stainless steel flow sensor tube with one, and more typically two or more, resistive elements in thermally conductive contact with the sensor tube. The resistive elements are typically composed of a material having a high temperature coefficient of resistance. Each of the elements can act as a heater, a detector, or both. One or more of the elements is energized with electrical current to supply heat to the fluid stream through the tube. If the heaters are supplied with constant current, the rate of fluid mass flow through the tube can be derived from temperature differences in the elements. Fluid mass flow rates can also be derived by varying the current through the heaters to maintain a constant temperature profile.

Such thermal mass flow sensors may be attached as a part of a mass flow controller, with fluid from the controller's main channel feeding the capillary tube (also referred to herein as the sensor tube). The portion of the main channel to which the inlet and outlet of the sensor tube are attached is often referred to as the "bypass" of the flow sensor. Many applications employ a plurality of mass flow controllers to regulate the supply of fluid through a supply line, and a plurality of the supply lines may be "tapped off" a main fluid supply line. A sudden change in flow to one of the controllers may create pressure fluctuations at the inlet to one or more of the other controllers tapped off the main supply line. Such pressure fluctuations create differences between the flow rate at the inlet and outlet of an affected mass flow controller. Because thermal mass flow sensors measure flow at the inlet of a mass flow controller and outlet flow from the controller is the critical parameter for process control, such inlet/outlet flow discrepancies can lead to significant process control errors.

In a semiconductor processing application, a process tool may include a plurality of chambers with each chamber having one or more mass flow controllers controlling the flow of gas into the chamber. Each of the mass flow controllers is typically re-calibrated every two weeks. The re-calibration process is described, for example, in U.S. Pat. No. 6,332,348 B1, issued to Yelverton et al. Dec. 25, 2001, which is hereby incorporated by reference. In the course of such an "In Situ" calibration, conventional methods require a technician to connect a mass flow meter in line with each of the mass flow controllers, flow gas through the mass flow meter and mass flow controller, compare the mass flow controller reading to that of the mass flow meter and adjust calibration constants, as necessary. Such painstaking operations can require a great deal of time and, due to labor costs and the unavailability of process tools, with which the mass flow controllers operate, can be very costly.

A mass flow sensor that substantially eliminates sensitivity to pressure variations would therefore be highly desirable. A convenient calibration method and apparatus for mass flow controllers would also be highly desirable. More flexible access to a mass flow controller would also be highly desirable. Apparatus and method for increasing the control performance of a mass flow controller would also be highly desirable.

SUMMARY OF THE INVENTION

In an illustrative embodiment, a mass flow controller in accordance with the principles of the present invention includes the combination of a thermal mass flow sensor and a pressure sensor to provide a mass flow controller that is relatively insensitive to fluctuations in input pressure. The new controller is relatively inexpensive, that is, it does not require a pair of expensive, precision, pressure sensors nor an all-stainless steel wetted surface differential sensor. Nevertheless, the new controller is adapted to control fluid flow over a broad range of fluid pressures. The new mass flow controller includes a thermal mass flow sensor, a pressure sensor, and an electronic controller. The thermal mass flow sensor is configured to measure the inlet flow of the controller. The pressure sensor senses the pressure within the volume in the channel between the flow sensor's bypass and an outlet control valve, which volume will be referred to herein as the "dead volume." The pressure sensor and thermal mass flow sensor respectively provide signals to the controller indicating the measured inlet flow rate and the pressure within the dead volume. A temperature sensor may be employed to sense the temperature of the fluid within the dead volume. In an illustrative embodiment, the temperature sensor senses the temperature of the controller's wall, as an approximation of the temperature of the fluid within the dead volume. The volume of the dead volume is determined, during manufacturing or a calibration process, for example, and may be stored or downloaded for use by the electronic controller.

The controller employs the measured pressure within the dead volume to compensate the measured inlet flow rate figure and to thereby produce a compensated measure of the outlet flow rate as a function of the measured pressure and measure inlet flow rate. This compensated measure of outlet flow rate may be used to operate a mass flow controller control valve. By reading the pressure sensor output over a period of time, the electronic controller determines the time rate of change of pressure within the dead volume. Given the dead volume, the temperature of the fluid within the dead volume, and the input flow rate sensed by the thermal mass flow sensor, the electronic controller computes the fluid flow rate at the output of the mass flow controller as a function of these variables. The electronic controller employs this computed output fluid flow rate in a closed loop control system to control the opening of the mass flow controller output control valve. In an illustrative embodiment the pressure sensed by the pressure sensor may also be displayed, locally (that is, at the pressure sensor) and/or remotely (at a control panel or through a network interface, for example).

In accordance with another aspect of the principles of the present invention, a variable-flow fluid source, a receptacle of known volume, and a pressure differentiator may be used to calibrate a mass flow controller. The variable-flow fluid source supplies gas at varying rates to the mass flow controller being calibrated and at proportional rates to a receptacle of known volume. A pressure differentiator computes the time derivative of gas flow into the receptacle of known volume and, from that, the actual flow into the receptacle. Given the actual flow, the proportionate flow into the mass flow controller may be determined and the flow signal from the mass flow controller correlated to the actual flow. In an illustrative embodiment, a mass flow controller closes the outlet valve to form a receptacle of known volume (the dead volume). A pressure sensor located within the dead volume produces a signal that is representative of the pressure within the dead volume. With the outlet valve closed, the flow into the dead volume decreases exponentially while the pressure increases, until the pressure within the dead volume is equal to that at the inlet to the mass flow controller. The mass flow controller's electronic controller takes the time derivative of the pressure at a plurality of times. Given the dead volume/receptacle volume, the time derivative of the pressure within the dead volume, and the temperature of the gas, the controller computes the flow rate at those sample times. The electronic controller also correlates the flow rates thus computed to the flow readings produced by the mass flow controller's thermal mass flow sensor, thereby calibrating the mass flow controller. This operation is self-contained, in that it doesn't require the use of external mass flow meters or other calibration devices. Various techniques and mechanisms may be employed to extend the period of time over which flow continues into the dead volume, thereby permitting the computation of a greater number of correlation, or calibration, points. For example, the outlet valve may be fully opened before being shut at the beginning of a calibration process or flow restrictors may be inserted at various locations within the gas flow path, for example.

In accordance with another aspect of the principles of the present invention, a mass flow controller includes an interface that permits an operator, such as a technician, to conduct diagnostics through a network. Such diagnostics may be "active", "passive" "on-line", "off-line", "manual", or "automatic" or various combinations of the above. By "active" diagnostics, we mean diagnostics that permit an operator to change drive signals in addition to, or instead of, monitoring signals. Enabling the use of drive signals permits a technician to alter a test point setting, to thereby change current through a resistor, for example. The technician may then monitor a corresponding signal, from a current sensor, for example. Or, a technician may elect to alter the drive signal to a valve actuator directly, as opposed to setting a flow set-point and relying upon the mass flow controller's electronic controller to adjust the valve drive signal in the desired manner. Because such alterations present the potential for creating flow control errors, access to such control may be limited, through use of passwords and other security measures, for example, at the network level. The term "passive" diagnostics refers to diagnostics that include monitoring functions, for example. The term "on-line" diagnostics is used to refer to diagnostics that are both real time and operating concurrently with the mass flow controller's process control operations. The term "off-line" diagnostics refers to diagnostics that, although they may be real time, are not operating during a mass flow controller's process control operations. The term "automatic" diagnostics refers to diagnostics including a plurality of diagnostic steps, each of which may be active or passive. The term "manual" diagnostics refers to diagnostics that are responsive on a step by step basis, to an operator's input.

A mass flow controller in accordance with another aspect of the principles of the present invention includes a web server that permits an operator, such as a technician, to interact with the mass flow controller from a web-enabled device, such as a workstation, laptop computer, or personal digital assistant, for example, over an interworking network, such as the Internet. The mass flow controller web server may include web pages that provide manufacturer's part number, specification, installation location, and performance information, for example. Additionally, diagnostics may be conducted from a web-enabled device over an interworking network.

In accordance with yet another aspect of the principles of the present invention, a mass flow controller may include a pressure display that displays the pressure within the mass flow controller. The display may be local, that is, directly in contact with or supported by the mass flow controller, or the display may be remote, at a gas box control panel, for example. In an illustrative embodiment, a pressure sensor is positioned to measure the pressure within a mass flow controller's dead volume and that is the pressure that is displayed.

A dual-processor mass flow controller in accordance with the still another aspect of the principles of the present invention includes a deterministic processor that performs the mass flow controllers' control duties and a non-deterministic processor that handles such tasks as providing a user interface. In an illustrative embodiment, the deterministic processor is a digital signal processor (DSP).

In accordance with yet another aspect of the principles of the present invention, a plurality of executable code sets may be uploaded by a mass flow controller's electronic controller. In an illustrative embodiment, a dual processor mass flow controller's non-deterministic processor uploads a plurality of executable code sets for the deterministic processor and selects among the code sets those for the deterministic processor to execute. Such selection by the non-deterministic processor may enable a form of customization.

These and other advantages of the present disclosure will become more apparent to those of ordinary skill in the art after having read the following detailed descriptions of the preferred embodiments, which are illustrated in the attached drawing figures. For convenience of illustration, elements within the Figures may not be drawn to scale.

BRIEF DESCRIPTION OF DRAWINGS

FIGS. 13A through 13E are screen shots of web pages such as may be employed by a web server embedded within a mass flow controller in accordance with the principles of the present invention.

DETAILED DESCRIPTION OF DISCLOSURE

Figure 1:
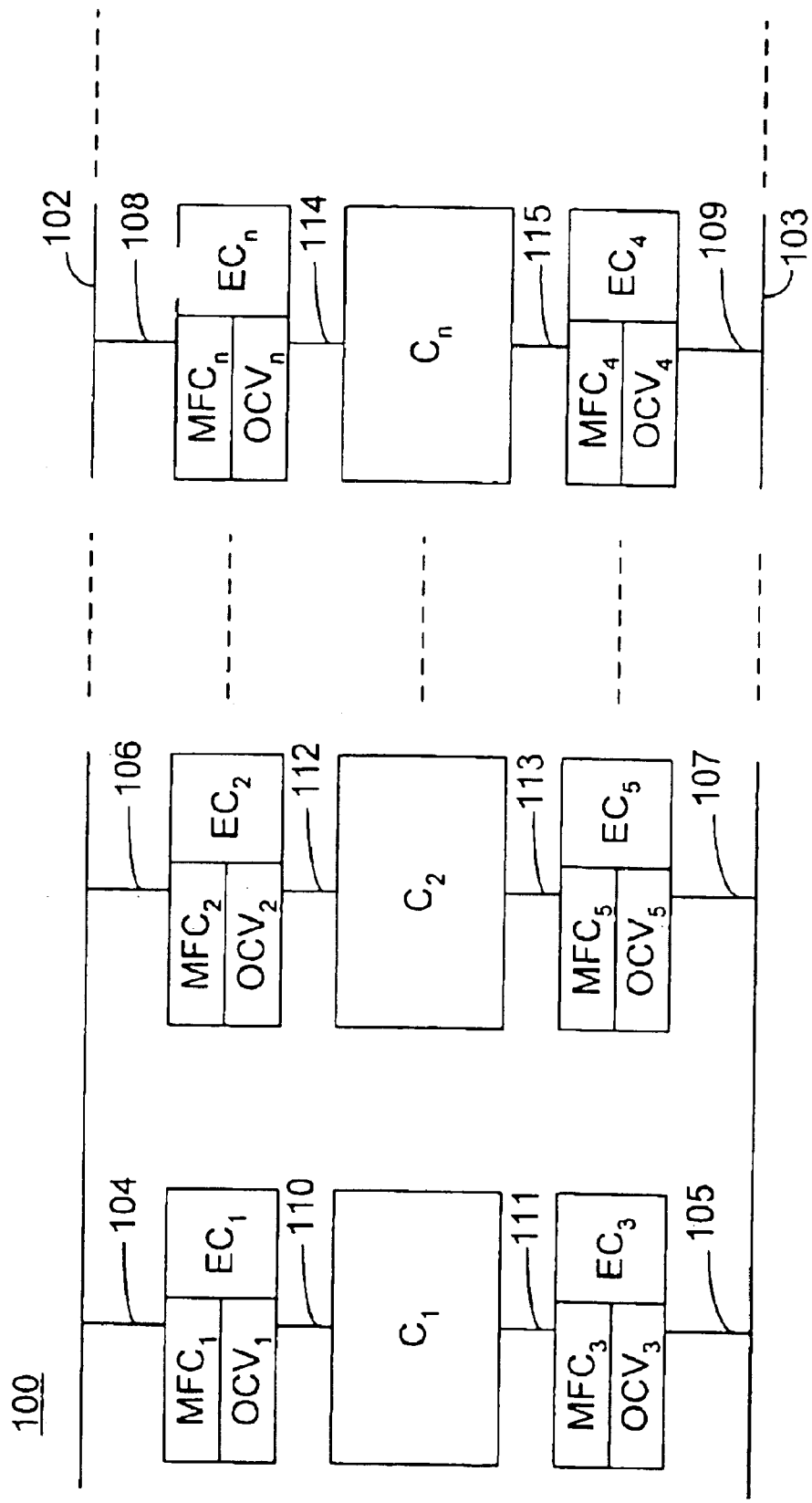
FIG. 1 is a block diagram of a system that includes a mass flow sensor in accordance with the principles of the present invention.

A mass flow sensor in accordance with one aspect of the principles of the present invention employs a thermal mass flow sensor to sense and provide a measure of the flow of fluid into an inlet of a fluid flow device, such as a mass flow controller. In an illustrative embodiment, the mass flow sensor uses a pressure sensor to compensate the inlet flow measure provided by the thermal mass flow sensor to thereby provide an indicator that more accurately reflects the fluid flow at the outlet of the associated mass flow controller. A system 100 that benefits from and includes the use of a mass flow sensor in accordance with the principles of the present invention is shown in the illustrative block diagram of FIG. 1.

A plurality of mass flow controllers MFC1, MFC2, . . . MFCn receive gas from main gas supply lines 102,103. The mass flow controllers, MFC1, MFC2, . . . MFCn are respectively connected through inlet supply lines 104, 106, . . . 109 to a main gas supply line 102,103 and through respective outlet supply lines 110, 112, . . . 115 to chambers C1, C2, . . . Cn. In this illustrative embodiment, the term "chamber" is used in a broad sense, and each of the chambers may be used for any of a variety of applications, including, but not limited to, reactions involved in the production of semiconductor components. Generally, users of the chambers are interested in knowing and controlling the amount of each gas supplied to each of the chambers C1, C2, . . . Cn. Each chamber C1, C2, . . . Cn may also include one or more additional inlet lines for the supply of other types of gases. Outflow from the chambers may be routed through lines (not shown) for recycling or disposal.

The mass flow controllers, MFC1, MFC2, . . . MFCn, include respective mass flow sensors MFS1, MFS2, . . . MFSn, electronic controllers EC1, EC2, . . . ECn and outlet control valves OCV1, OCV2, . . . OCVn. At least one of the mass flow sensors is, and, for ease of description, assume all are, compensated mass flow sensors in accordance with the principles of the present invention. Each mass flow sensor senses the mass of gas flowing into the mass flow controller and provides a signal indicative of the sensed value to a corresponding electronic controller. The electronic controller compares the indication of mass flow as indicated by the sensed value provided by the mass flow sensor to a set point and operates the outlet control valve to minimize any difference between the set point and the sensed value provided by the mass flow sensor. Typically, the set point may be entered manually, at the mass flow controller, or downloaded to the mass flow controller. The setpoint may be adjusted, as warranted, through the intervention of a human operator or automatic control system. Each of the inlet supply lines 104, 106, . . . 109 may be of a different gauge, and/or may handle any of a variety of flow rates into the mass flow controller. In accordance with one aspect of the principles of the present invention, a single electronic controller, such as electronic controller EC1, may be linked to and operate a plurality of mass flow sensor/outlet control valve combinations. That is, for example, any number of the illustrated electronic controllers EC2 through ECn may be eliminated, with the corresponding mass flow sensors and outlet control valves linked to the electronic controller EC1 for operation.

An abrupt change of flow rate, due to a change in set point for example, into any of the mass flow controllers may be reflected as an abrupt pressure change at the inlet of one or more of the other mass flow controllers. This unwanted side effect may be more pronounced in a relatively low flow rate mass flow controller if the abrupt change occurs in a high flow-rate mass flow controller. Because the mass flow sensors in this illustrative embodiment are thermal mass flow sensors positioned to sense flow in the mass flow controller at the inlet to the mass flow controller, the mass flow sensed by the thermal mass flow sensor may not accurately reflect the flow at the outlet of the controller. In order to compensate for this discrepancy, a mass flow sensor in accordance with one aspect of the principles of the present invention includes a pressure sensor positioned to provide an indication of the pressure within the volume between the inlet and outlet of the mass flow controller. In an illustrative embodiment, the pressure sensor is located in the "dead volume" between the thermal mass flow sensor's bypass and the outlet control valve. An electronic controller employs the indication of pressure provided by the pressure sensor to compensate the measure of mass flow provided by the thermal mass flow sensor. The result, a compensated mass flow indication, more accurately reflects the flow at the outlet of the mass flow controller and, consequently, this indication may be employed to advantage by a mass flow controller in the operation of its outlet control valve. A display may be included to display the sensed pressure. The display may be local, attached to or supported by the mass flow controller, or it may be remote, at a gas box control panel, for example, connected to the mass flow controller through a data link.

In a semiconductor processing application, a process tool may include a plurality of chambers with each chamber having a plurality of mass flow controllers respectively controlling the flow of constituent gases into the chamber. Usually, each of the mass flow controllers of the prior art is typically re-calibrated every two weeks. The re-calibration process is described, for example, in U.S. Pat. No. 6,332,348 B1, issued to Yelverton et al. Dec. 25, 2001, which is hereby incorporated by reference. In the course of such an "In Situ" calibration, conventional methods require a technician to (1) connect a mass flow meter in line with each of the mass flow controllers, (2) flow gas through the mass flow meter and mass flow controller, (3) compare the mass flow controller reading to that of the mass flow meter and (4) adjust calibration constants, as necessary. Such painstaking operations can require a great deal of time and, due to labor costs and the unavailability of process tools with which the mass flow controllers operate, can be very costly. In an illustrative embodiment described in greater detail in the discussion related to FIG. 7, a mass flow controller in accordance with the principles of the present invention includes a self-calibrating mechanism that substantially eliminates such tedious and costly chores.

Figure 2:
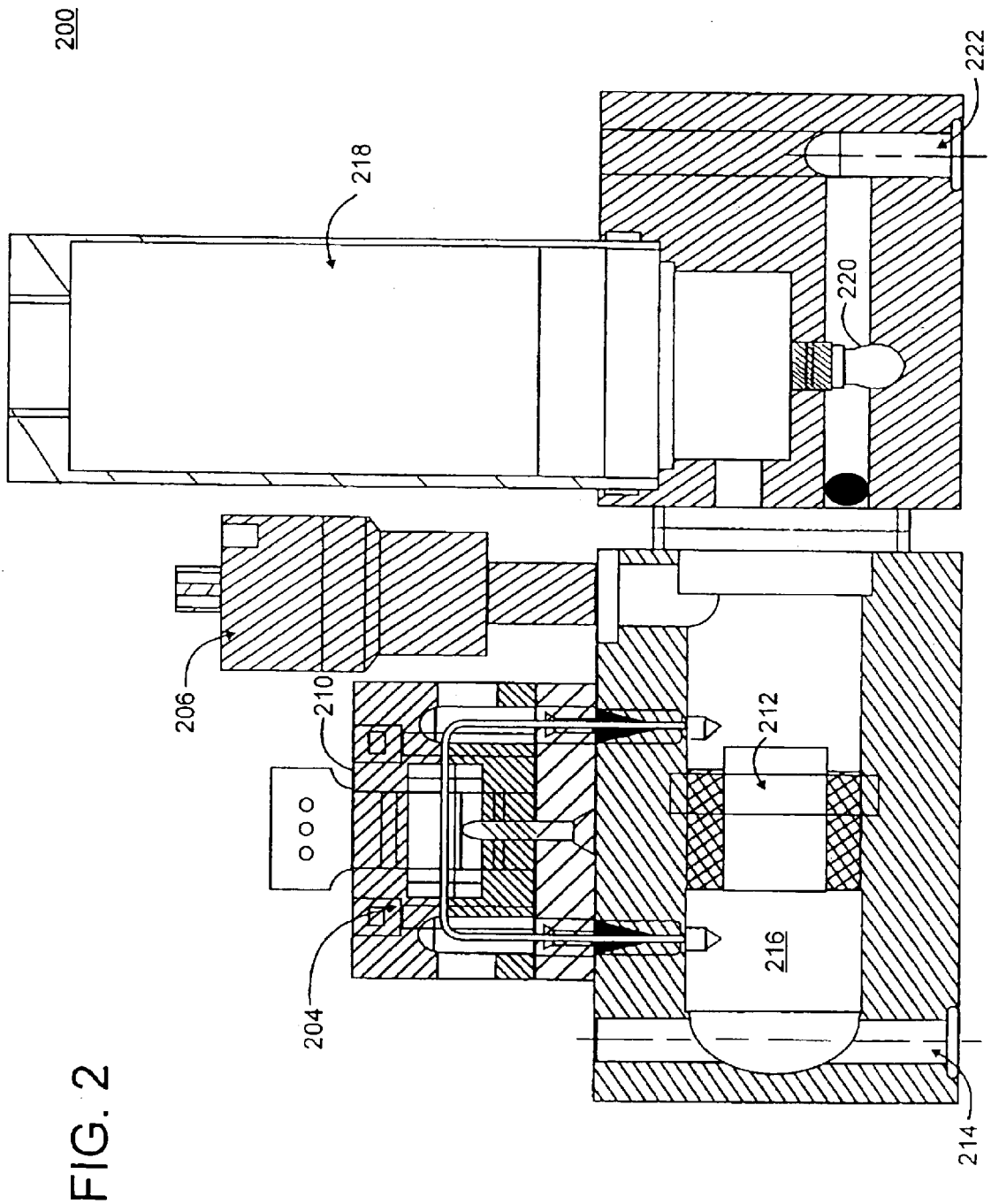
FIG. 2 is a sectional view of a mass flow controller that employs a mass flow sensor in accordance with the principles of the present invention.

The sectional view of FIG. 2 provides an illustration of a mass flow controller 200 that employs a mass flow sensor 202 in accordance with one aspect of the principles of the present invention. The mass flow sensor 202 includes a thermal mass flow sensor 204, a pressure sensor 206, a temperature sensor 208 and an electronic controller 210. A laminar flow element 212 establishes a pressure drop across the capillary tube of the thermal mass flow sensor 204, as will be described in greater detail in the discussion related to FIG. 3. In operation, a fluid that is introduced to the mass flow controller 200 through the inlet 214 proceeds through the bypass channel 216 containing the laminar flow element 212. A relatively small amount of the fluid is diverted through the thermal mass flow sensor 204 and re-enters the bypass channel 216 downstream of the laminar flow element 212. The electronic controller 210 provides a signal to the control valve actuator 218 to thereby operate the outlet control valve 220 in a way that provides a controlled mass flow of fluid to the outlet 222. The pressure sensor 206 senses the pressure within the volume within the bypass channel 216 between the laminar flow element 212 and the outlet control valve 220, referred to herein as the "dead volume" As will be described in greater detail in the discussion related to FIG. 5, the electronic controller 210 employs the pressure sensed within the dead volume by the sensor 206 to compensate the inlet flow rate sensed by the thermal mass flow sensor 204. This compensated inlet flow rate figure more closely reflects the outlet flow rate, which is the ultimate target of control. In particular, a mass flow sensor in accordance with one aspect of the principles of the present invention is a combination sensor that employs the time rate of change of pressure within a known volume to provide a precise measure of mass flow during pressure transients and a thermal mass flow sensor that may be "corrected" using the pressure-derived mass flow measurement. Both the thermally-sensed and pressure-derived mass flow measurements are available for processing. The temperature sensor 208 senses the temperature of the fluid within the dead volume. In an illustrative embodiment, the temperature sensor 208 senses the temperature of a wall of the controller, as an approximation of the temperature of the fluid within the dead volume 216a.

The volume of the dead volume is determined, during manufacturing or a calibration process, for example, and may be stored or downloaded for use by the electronic controller 210. By taking sequential readings from the pressure sensor 206 output and operating on that data, the electronic controller 210 determines the time rate of change of pressure within the dead volume. Given the dead volume, the temperature of the fluid within the dead volume, the input flow rate sensed by the thermal mass flow sensor 204, and the time rate of change of pressure within the dead volume, the electronic controller 210 approximates the fluid flow rate at the output 222 of the mass flow controller 200. As previously noted, this approximation may also be viewed as compensating the mass flow rate figure produced by the thermal mass flow sensor 204. The electronic controller 210 employs this computed output fluid flow rate in a closed loop control system to control the opening of the mass flow controller outlet control valve 220. In an illustrative embodiment the value of the pressure sensed by the pressure sensor 206 may also be displayed, locally (that is, at the pressure sensor) and/or remotely (at a control panel or through a network interface, for example). In a self-calibrating process described hereinafter in the discussion related to FIG. 7, the electronic controller 210 may take the time derivative of the pressure signal when the flow rate varies in the mass flow controller and thereby derive the actual flow rate into the mass flow controller. The actual flow rate may then be used to calibrate the mass flow controller.

Figure 3:
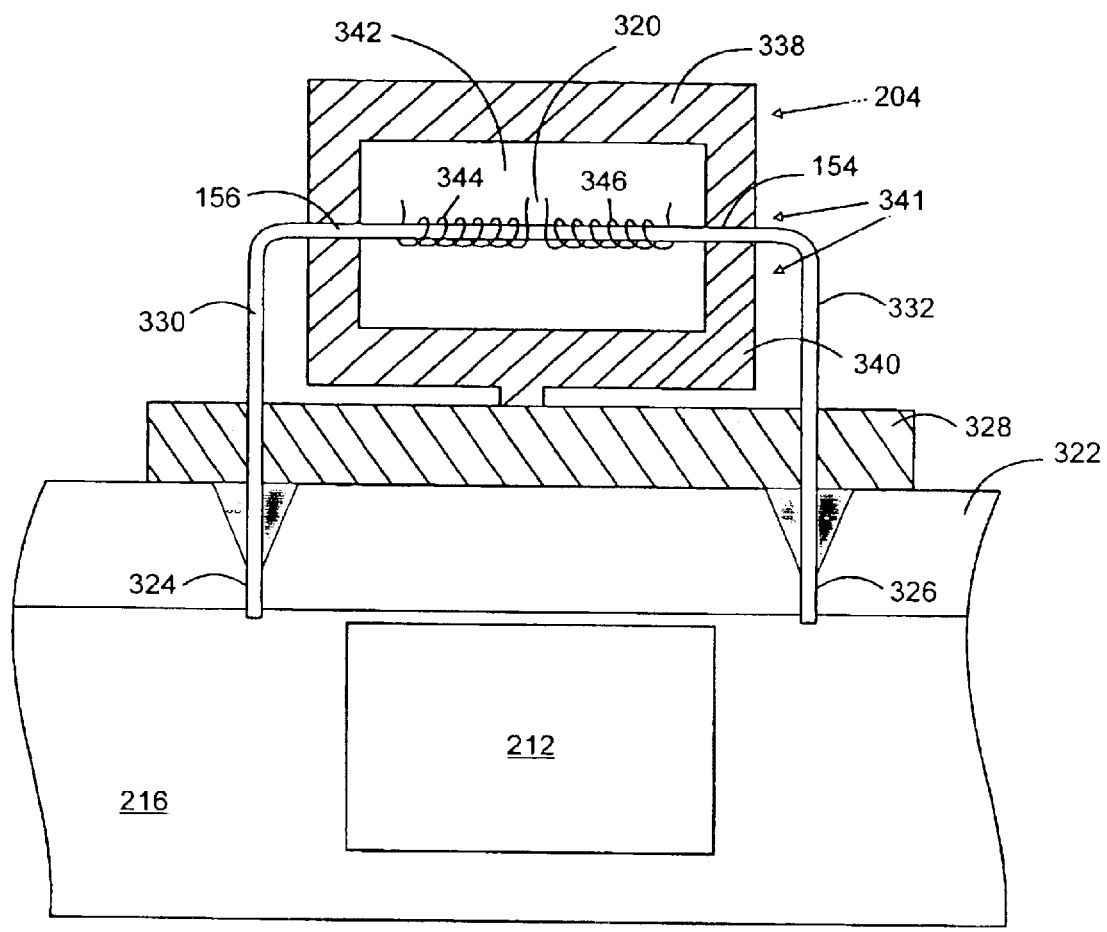
FIG. 3 is a sectional view of an illustrative thermal mass flow sensor as used in conjunction with a pressure sensor to produce a compensated indication of mass flow through a mass flow controller.

The sectional view of FIG. 3 provides a more detailed view of a thermal mass flow sensor 204, such as may be employed in conjunction with a pressure sensor to produce a compensated mass flow indication that is, in a digital implementation, a multi-bit digital value. The multi-bit digital value provides a closer approximation to the actual mass flow at the outlet of a mass flow controller than an uncompensated mass flow sensor would, particularly during pressure transients on the mass flow controller inlet lines. The thermal mass flow sensor 204 includes laminar flow element 212, which rests within the bypass channel 216 and provides a pressure drop across the bypass channel 216 for the thermal mass flow sensor 204 and drives a portion of the gas through the sensor capillary tube 320 of the thermal mass flow sensor 204. The mass flow sensor 202 includes circuitry that senses the rate of flow of gas through the controller 200 and controls operation of the control valve 220 accordingly. The thermal mass flow sensor assembly 204 is attached to a wall 322 of the mass flow controller that forms a boundary of the bypass channel 216. Input 324 and output 326 apertures in the wall 322 provide access to the mass flow sensor assembly 204 for a gas traveling through the mass flow controller and it is the portion of this passageway between the input and output that typically defines the bypass channel. In this illustrative embodiment the mass flow sensor assembly 204 includes a baseplate 328 for attachment to the wall 322. The baseplate 328 may de attached to the wall and to the remainder of the sensor assembly using threaded hole and mating bolt combinations, for example. Input 330 and output 332 legs of the sensor tube 320 extend through respective input 334 and output 336 apertures of the baseplate 328 and, through apertures 324 and 326, the mass flow controller wall 322.

The mass flow sensor assembly preferably includes top 338 and bottom 340 sections that, when joined, form a thermal clamp 341 that holds both ends of the sensor tube 320 active area (that is, the area defined by the extremes of resistive elements in thermal contact with the sensor tube) at substantially the same temperature. The thermal clamp also forms a chamber 342 around the active area of the sensor tube 320. That is, the segment of the mass flow sensor tube within the chamber 342 is in thermal communication with two or more resistive elements 344, 346, each of which may act as a heater, a detector, or both. One or more of the elements is energized with electrical current to supply heat to the fluid as it streams through the tube 320. The thermal clamp 341, which is typically fabricated from a material characterized by a high thermal conductivity relative to the thermal conductivity of the sensor tube, makes good thermally conductive contact with the portion of the sensor tube just downstream from the resistive element 344 and with the portion of the sensor tube just upstream from the resistive element 346. The thermal clamp thereby encloses and protects the resistive element 344 and 346 and the sensor tube 320. Additionally, the thermal clamp 341 thermally "anchors" those portions of the sensor tube with which it makes contact at, or near, the ambient temperature. In order to eliminate even minute errors due to temperature differentials, the sensor tube may be moved within the thermal clamp to insure that any difference between the resistance of the two coils is due to fluid flow through the sensor tube; not to temperature gradients imposed upon the coils from the environment.

In this illustrative embodiment, each of the resistive elements 344 and 346 includes a thermally sensitive resistive conductor that is wound around a respective portion of the sensor tube 320. Each of the resistive elements extends along respective portions of the sensor tube 320 along an axis defined by the operational segment of the sensor tube 320. Downstream resistive element 346 is disposed downstream of the resistive element 344. The elements abut one another or are separated by a small gap for manufacturing convenience and are preferably electrically connected at the center of the tube. Each resistive element 344, 346 provides an electrical resistance that varies as a function of its temperature. The temperature of each resistive element varies as a function of the electrical current flowing through its resistive conductor and the mass flow rate within the sensor tube 320. In this way, each of the resistive elements 344, 346 operates as both a heater and a sensor. That is, the element acts as a heater that generates heat as a function of the current through the element and, at the same time, the element acts as a sensor, allowing the temperature of the element to be measured as a function of its electrical resistance. The thermal mass flow sensor 204 may employ any of a variety of electronic circuits, typically in a Wheatstone bridge arrangement, to apply energy to the resistive elements 346 and 344, to measure the temperature dependent resistance changes in the element and, thereby, the mass flow rate of fluid passing through the sensor tube 320. Circuits employed for this purpose are disclosed, for example, in U.S. Pat. 5,461,913, issued to Hinkle et al and U.S. Pat. 5,410,912 issued to Suzuki, both of which are hereby incorporated by reference in their entirety.

In operation, fluid flows from the inlet 214 to the outlet 222 and a portion of the fluid flows through the restrictive laminar flow element 212. The remaining and proportional amount of fluid flows through the sensor tube 320. The circuit (not shown here) causes an electrical current to flow through the resistive elements 344 and 346 so that the resistive elements 344 and 346 generate and apply heat to the sensor tube 320 and, thereby, to the fluid flowing through the sensor tube 320. Because the upstream resistive element 346 transfers heat to the fluid before the fluid reaches the portion of the sensor tube 320 enclosed by the downstream resistive element 344, the fluid conducts more heat away from the upstream resistive element 346 than it does from the downstream resistive element 344. The difference in the amount of heat conducted away from the two resistive elements is proportional to the mass flow rate of fluid within the sensor tube and, by extension, the total mass flow rate through the mass flow rate controller 200 from the input port 214 through the output port 222. The circuit measures this difference by sensing the respective electrical resistances of resistive elements 344, 346 and generates an output signal that is representative of the mass flow rate through the sensor tube 320.

Figure 4:
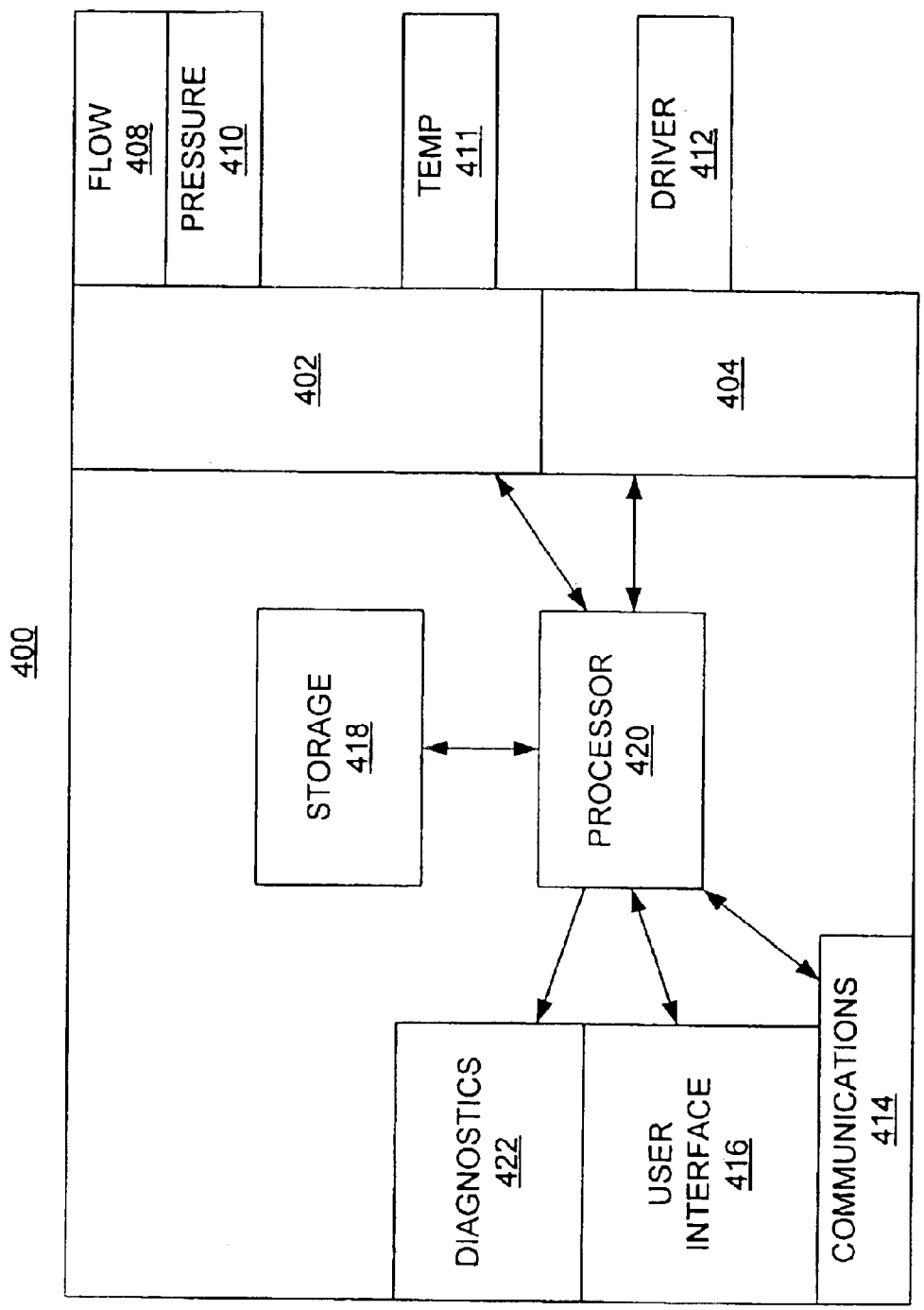
FIG. 4 is a block diagram of the control electronics employed by an illustrative embodiment of a mass flow sensor in accordance with the principles of the present invention.

The conceptual block diagram of FIG. 4 illustrates the architecture of an electronic controller 400 such as may be used in a mass flow sensor in accordance with the principles of the present invention. In this illustrative embodiment, the controller 400 includes sensor 402 and actuator 404 interfaces. Among the sensor interfaces 402, a flow sensor interface 408 operates in conjunction with a mass flow sensor to produce a digital representation of the rate of mass flow into an associated mass flow controller. The controller 400 may include various other sensor interfaces, such as a pressure sensor interface 410 or a temperature sensor interface 411. One or more actuator drivers at interface 412 are employed by the controller 400 at the actuator 404 to control, for example, the opening of an associated mass flow controller's output control valve. The actuator may be any type of actuator, such as, for example, a current-driven solenoid or a voltage-driven piezo-electric actuator.

The controller 400 operates in conjunction with a mass flow controller to produce a digital representation of the rate of mass flow into an associated mass flow controller. A thermal mass flow controller, such as described in the discussion related to FIG. 3, may be employed to produce the mass flow measurement. The controller 400 may employ a pressure sensor interface 410 to monitor the pressure of fluid within an associated mass flow controller. In an illustrative embodiment, a pressure sensor, such as the pressure sensor 206 of FIG. 2, provides a measure of the pressure within the mass flow controller. More specifically, in this illustrative embodiment, the sensor measures the pressure within dead volume of the mass flow controller. In an illustrative embodiment, the mass flow controller pressure thus measured may be displayed, at the pressure sensor 206 or at the controller housing, for example, or some other location.

The controller 400 may convert the pressure measurement to digital form and employ it in analysis or other functions. For example, if the mass flow controller employs a thermal mass flow sensor, the controller 400 may use the mass flow controller pressure measurement to compensate for inlet pressure transients. Although a temperature sensor interface may be used to obtain a temperature reading from a temperature sensor attached, for example, to the wall of a mass flow controller, a separate temperature sensor may not be required for each mass flow controller. For example, mass flow controllers are often employed, as described in greater detail in the discussion related to FIG. 1, in conjunction with a semiconductor processing tool that includes a number of mass flow controllers and other devices that are all linked to a controller, such as a workstation. The processing tool is operated within a carefully controlled environment that features a relatively stable temperature. Because the temperature of the fluid within the mass flow controller is very nearly equal to that of the wall of the enclosure and the wall of the enclosure is very nearly the temperature of the room within which the tool is housed, a temperature measurement from, for example, the workstation that controls the tool, may provide a sufficiently accurate estimate of the gas temperature within the mass flow controller. Consequently, in addition to, or instead of, employing a separate temperature sensor on each mass flow controller, the temperature may be obtained from another sensor within the same environment as the mass flow controller: one located at a workstation, for example.

The controller 400 includes a local user interface 416 that may be used with one or more input devices, such as a keypad, keyboard, mouse, trackball, joy stick, buttons, touch screens, dual inline packaged (DIP) or thumb-wheel switches, for example, to accept input from users, such as technicians who operate a mass flow controller. The local user interface 414 may also include one or more outputs suitable for driving one or more devices, such as a display, which may be an indicator light, a character, alphanumeric, or graphic display, or an audio output device used to communicate information from a mass flow controller to a user, for example. A communications interface 416 permits a mass flow controller to communicate with one or more other instruments, and/or with a local controller, such as a workstation that controls a tool that employs a plurality of mass flow controllers and/or other devices in the production of integrated circuits, for example.

In this illustrative example, the communications interface 414 includes a DeviceNet interface. DeviceNet is known and discussed, for example, in U.S. Pat. No. 6,343,617 B1 issued to Tinsley et al. Feb. 5, 2002, which is hereby incorporated by reference. The controller 400 also includes storage 418 in the form, for example, of electrically erasable programmable read only memory (EEPROM) that may be used to store calibration data, mass flow controller identification, or code for operating the mass flow controller, for example. Various other forms of storage, such as random access memory (RAM), may be employed. The storage can take many forms, and, for example, may be distributed, with portions physically located on a controller "chip" (integrated circuit) and other portions located off-chip. The controller 400 employs a data processor 420, which might take the form of an arithmetic logic unit (ALU) in a general purpose microprocessor, for example, to reduce data. For example, the data processor 420 may average readings received at the sensor inputs, determine the number of times a sensor reading has exceeded one or more threshold values, record the time a sensor reading remains beyond a threshold value, or perform other forms of data logging.

Pressure transients on the inlet supply line to a mass flow controller that employs a thermal mass flow sensor may create erroneous mass flow readings. Erroneous mass flow readings may lead, in turn, to improper control of a mass flow controller's outlet valve, which could damage or destroy articles being processed with gasses under control of the mass flow controller. The digital representation of mass flow may take the form of one or more data values and is subject to fluctuations due to pressure transients on the inlet line of the mass flow sensor. In an illustrative embodiment, the controller 400 employs data obtained at the pressure sensor interface 410 to compensate for fluctuations induced in a thermal mass flow sensor by pressure transients on the mass flow sensor inlet line. In this illustrative embodiment, the controller 400 obtains temperature information through a temperature interface 411. The controller 400 employs the temperature, pressure, and mass flow readings obtained from the respective interfaces, to produce a compensated mass flow reading that more closely reflects the mass flow at the outlet of the mass flow sensor than a reading from the thermal mass flow sensor alone provides. The controller 400 also provides control to sensors, as necessary, through flow sensor interface, pressure sensor interface, and temperature interfaces, 408, 410, and 411, respectively.

The controller 400 also includes a valve actuator interface 404, which the controller 400 employs to control the position of a valve, such as the valve 220 of FIG. 2, to thereby control the rate of fluid flow through a mass flow controller, such as the mass flow controller 200, in a closed-loop control process. The valve actuator may be a solenoid-driven actuator or piezoelectric actuator, for example. The controller 400 must be capable of operating with sufficient speed to read the various sensor outputs, compensate as necessary, and adjust the mass flow controller outlet control valve to produce a predetermined flow rate. The flow rate is predetermined in the sense that it is "desired" in some sense. It is not predetermined in the sense that it must be a static setting. That is, the predetermined flow rate may be set by an operator using a mechanical means, such as a dial setting, or may be downloaded from another controller, such as a workstation, for example, and may be updated.

In an illustrative embodiment, the controller 400 employs readings from the pressure interface 410 to compensate flow measurements obtained at the mass flow interface 408 from a thermal mass flow sensor that senses mass flow at the inlet to mass flow controller, such as sensor 204, inlet 211 and controller 200. The compensated flow measurement more accurately depicts the flow at the outlet such as outlet 222 of the mass flow controller 200. This outlet flow is the flow being directly controlled by the mass flow controller 200 and typically is the flow of interest to end users. Employing a pressure-compensated flow measurement in accordance with the principles of the present invention improves the accuracy of a mass flow sensor's outlet flow reading and thereby permits a mass flow controller to more accurately control the flow of fluids. That is, at equilibrium, mass flow at a mass flow controller's inlet is equal to the mass flow at the outlet of the mass flow controller, but during inlet or outlet pressure transients, the flow rates differ, sometimes significantly. As a result, a mass flow controller that provides closed loop control using its inlet flow to control its outlet flow may commit substantial control errors.

The steady state mass flow in the capillary sensor tube 320 of a thermal mass flow sensor 204 such as described in the discussion related to FIG. 3 is generally described by the following equation:

$$Q_c = \frac{d_c^2}{32\mu} \frac{\rho_i}{\rho_R} \left( \frac{P_i - P}{L_c} \right) \quad (1)$$

where:
$d_c$=capillary tube inside diameter
$L_c$=capillary tube length
$\rho_i$=the density of the gas at the inlet
$\rho_R$=the density of the gas at standard temperature and pressure
$\mu$=the gas viscosity Pi=the pressure at the inlet of the mass flow controller Po=The pressure at the outlet of the mass flow controller P=the pressure in the dead volume of the mass flow controller The total flow through the mass flow controller is related to that through the capillary sensor tube 320 through a split ratio:

$$\alpha = QBP/Qc$$

where QBP is the flow through the bypass channel 216 and Qc is the flow through the capillary tube 320. The total flow Qi at the mass flow controller inlet 214 is:

$$Qi = QBP + Qc = (1+\alpha)Qc$$

If flow remains laminar in both the bypass and capillary, the split ratio will remain constant. When the inlet pressure varies with time, the nature of the inlet pressure transient and the pressurization of the dead volume govern the flow at the inlet. Assuming that all thermodynamic events within the dead volume occur at a constant temperature that is equal to the temperature of the enclosure that forms a partial receptacle around the dead volume, the mass conservation within the dead volume may be described by:

$$Q_o = Q_i - \frac{T_R V}{T_w P_R} \frac{dP}{dt} \qquad (2)$$

Where:

$P_R$=pressure at standard temperature and pressure (760 Torr.)

$T_R$=temperature at standard temperature and pressure (273 K)

$T_W$=wall temperature (temperature of the wall of the mass flow controller)

V=volume of the dead volume $Q_i$=inlet flow to the mass flow controller $Q_o$=outlet flow from the mass flow controller A mass flow sensor in accordance with the principles of the present invention employs the relationship of equation (2) to compensate a thermal mass flow sensor s mass flow signal and to thereby substantially reduce errors in mass flow readings during pressure transients.

Figure 5:
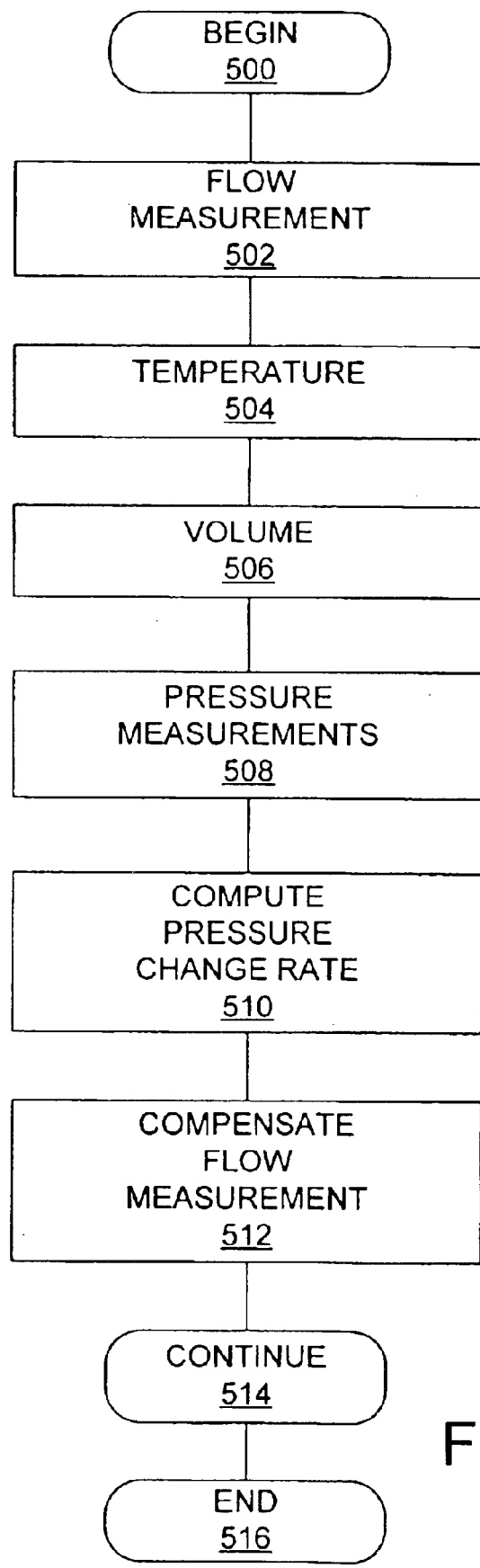
FIG. 5 is a flow chart of the process of compensating a thermal mass flow sensor signal in accordance with the principles of the present invention.

The flow chart of FIG. 5 depicts the process of compensating a thermal mass flow sensor reading in accordance with the principles of the present invention. The process begins in step 500 and proceeds from there to step 502 where a mass flow sensor's controller, such as the controller 400 of FIG. 4, obtains a mass flow reading. This reading may be obtained from a thermal mass flow sensor through a flow interface, such as interface 408 of FIG. 4, for example. This flow measurement reflects the rate of mass flow at the inlet of a mass flow controller and, as previously described, may not adequately represent the mass flow rate at the outlet of the mass flow controller. The mass flow rate at the outlet of a mass flow controller is generally the rate of interest for use in control applications. Consequently, a mass flow controller in accordance with the principles of the present invention compensates for the inaccuracy inherent in assuming that the inlet flow rate to a mass flow controller is equal to the outlet flow rate from the mass flow controller. From step 502 the process proceeds to step 504 where the sensor controller 400 obtains the temperature of the flow in the bypass channel. The temperature could be obtained through a temperature interface such as interface 412 of FIG. 4, or it may be downloaded to the compensated mass flow sensor. The compensation process may safely assume that the gas temperature is equal to the temperature of the enclosure of the mass flow controller. Additionally, in most applications, the temperature will remain relatively stable over a long period of time, so that a stored temperature value may be employed, with updates as necessary.

After obtaining the gas temperature in step 504 the process proceeds to step 506 where the sensor controller 400 obtains the volume of the dead volume 216a. This value may have been stored during manufacturing, for example. From step 506 the process proceeds to step 508 where the pressure within the dead volume 216a is obtained over a period of time. The number of measurements and the time over which the measurements are made depend upon the speed and duration of transients at the inlet of the mass flow controller. In step 510 the processor employs the pressure measurements made in step 508 to compute the time rate of change of pressure within the dead volume. After computing the time rate of change of pressure within the dead volume, the process proceeds to step 512 where a compensated outlet flow value is computed according to equation (2). Simplifications may be made in the computational process. For example, the volume of the dead volume, standard temperature, and standard pressure may all be combined into a single constant for use with the inlet flow measurement and time rate of change of pressure within the dead volume to compute a compensated outlet flow approximation. This simplification would yield an equation of the form:

$$Qo = Qi - C1(V/T)(dP/dt) \qquad (3)$$

where:

Qo=the compensated sensed outlet flow rate,

Qi=the sensed inlet flow rate,

C1=a normalizing constant relating the temperature and pressure to standard temperature and pressure V=the volume between the sensor bypass and the outlet flow control valve, T=the temperature of the fluid within the volume, dP/dt=time rate of change of pressure within the volume.

As previously noted, the volume V could be folded into the constant C1. From step 512 the process proceeds to step 514 where it continues, with the flow sensor's controller obtaining pressure, temperature, and flow readings and computing a compensated outlet flow estimate Qo, as described. The process proceeds from step 514 to end in step 516, for example, when the mass flow sensor is shut down.

Returning to the block diagram of FIG. 4, in this illustrative embodiment, the controller 400 includes a diagnostic interface 422 that permits an operator, such as a technician for example, to not only initiate, but conduct diagnostic tests on the mass flow controller. Furthermore, the interface 422 permits the operator to conduct the diagnostics in a manner that requires no input from the local system controller, which may be a workstation, that otherwise normally controls the mass flow controller. Such diagnostics are transparent to the local system controller, which may not even be made aware of the diagnostics being performed and may, consequently, continue its operations unabated. The diagnostic interface provides access to mass flow controller sensor measurements, control outputs and mass flow controller diagnostic inputs and outputs. These various inputs and outputs may be exercised and measured through the diagnostic interface with very little delay. In an illustrative dual-processor embodiment described in greater detail in the description related to the discussion of FIG. 9, a deterministic processor may modify outputs and/or monitor inputs, from sensors or test points, for example. During the execution of on-line diagnostics, the controller continues to execute its process control functions, unimpeded, while, at the same time, the controller may provide real-time interaction with a technician (i.e., interactions wherein the delays are imperceptible to a human operator) either locally or through a telecommunications connection.

Using the diagnostic interface 422 an operator can adjust control values, such as the set point, used to determine the mass flow controller's operation. Additionally, the operator may modify sensor output values in order to test the mass flow controller's response to specified sensor readings. That is, an operator can modify the sensor readings a mass flow controller employs to control the flow of gasses through its outlet valve and, thereby, exercise the controller for diagnostic purposes. An operator may read all sensor and test point inputs as well as information stored regarding control (stored by the deterministic controller in the dual processor embodiment), read all sensor values, read test point values, read control information, such as the desired set point. Additionally, the operator may write to control outputs and test points and over-write stored values, such as sensor readings or set point information in order to fully test the controller through the diagnostic port.

In an illustrative embodiment, a mass flow controller in accordance with the principles of the present invention may include a web server. Such a web server may be included within the diagnostic interface 422, for example. In such an embodiment, the diagnostic interface 422 includes a webserver that permits the mass flow controller to be used in a system such as illustrated in the block diagram of FIG. 6. In such a system, a user, such as a technician, may employ a web-enabled device 600 such as a personal computer, personal digital assistant, or cellular telephone that runs a web browser (e.g., Netscape or Explorer) to communicate with a server 602 embedded in the mass flow controller 604. The server 602 includes web pages that provide an interface for the user to the mass flow controller 604 in accordance with the principles of the present invention. The discussion related to FIGS. 13A through 13E provide greater detail related to the web server capability embedded in an illustrative embodiment of a mass flow controller in accordance with the principles of the present invention.

Mass flow sensors are typically calibrated during their manufacturing process. Because a mass flow sensor is usually incorporated into a mass flow controller, this discussion will center on mass flow controllers, but the methods and apparatus discussed herein are applicable to "standalone" mass flow sensors as well. The calibration process requires a technician to supply a gas at a known flow rate to the mass flow controller and correlate the mass flow sensor's flow signal to the known flow rate. For example, in the case of a mass flow sensor that provides a voltage output corresponding to flow, the technician maps the voltage output from the sensor into the actual flow rate. This process may be repeated for a plurality of flows in order to develop a set of voltage/flow correlations: for example, a 4 Volt output indicates a 40 standard cubic centimeter per minute (sccm) flow, a 5 Volt output indicates a 50 sccm flow, etc.

Flow rates that fall between calibration points may be interpolated using linear or polynomial interpretation techniques, for example. This process may be repeated for several gases. Correlation tables that relate the signal from the mass flow sensor (which may be a voltage) to flow rates for various gases may thus be developed and stored. Such tables may be downloaded to a mass flow controller for use "in the field", or may be stored within a mass flow controller.

Often, technicians calibrate a mass flow controller using a relatively innocuous gas, such as $N_2$, and provide calibration coefficients that may be used to correlate the flow of another gas to the calibration gas. These calibration coefficients may then be used in the field when a known gas is "flowed" through the mass flow controller to compute the actual flow from the apparent flow. That is, the apparent flow may be a flow correlated to $N_2$ and, if Arsine gas is sent through the mass flow controller, the mass flow controller multiplies the apparent flow by an Arsine gas calibration coefficient to obtain the actual flow. Additionally, once in the field, mass flow controllers may be re-calibrated on a regular basis to accommodate "drift", orientation, water content of a gas the flow of which is being controlled, or to compensate for other factors. U.S. Pat. No. 6,332, 348 B1, issued on Dec. 25, 2001 to Yelverton et al., which is hereby incorporated by reference, discusses these factors, and the unwieldy processes and equipment required to carry out these in-the-field calibrations in greater detail.

Figure 7:
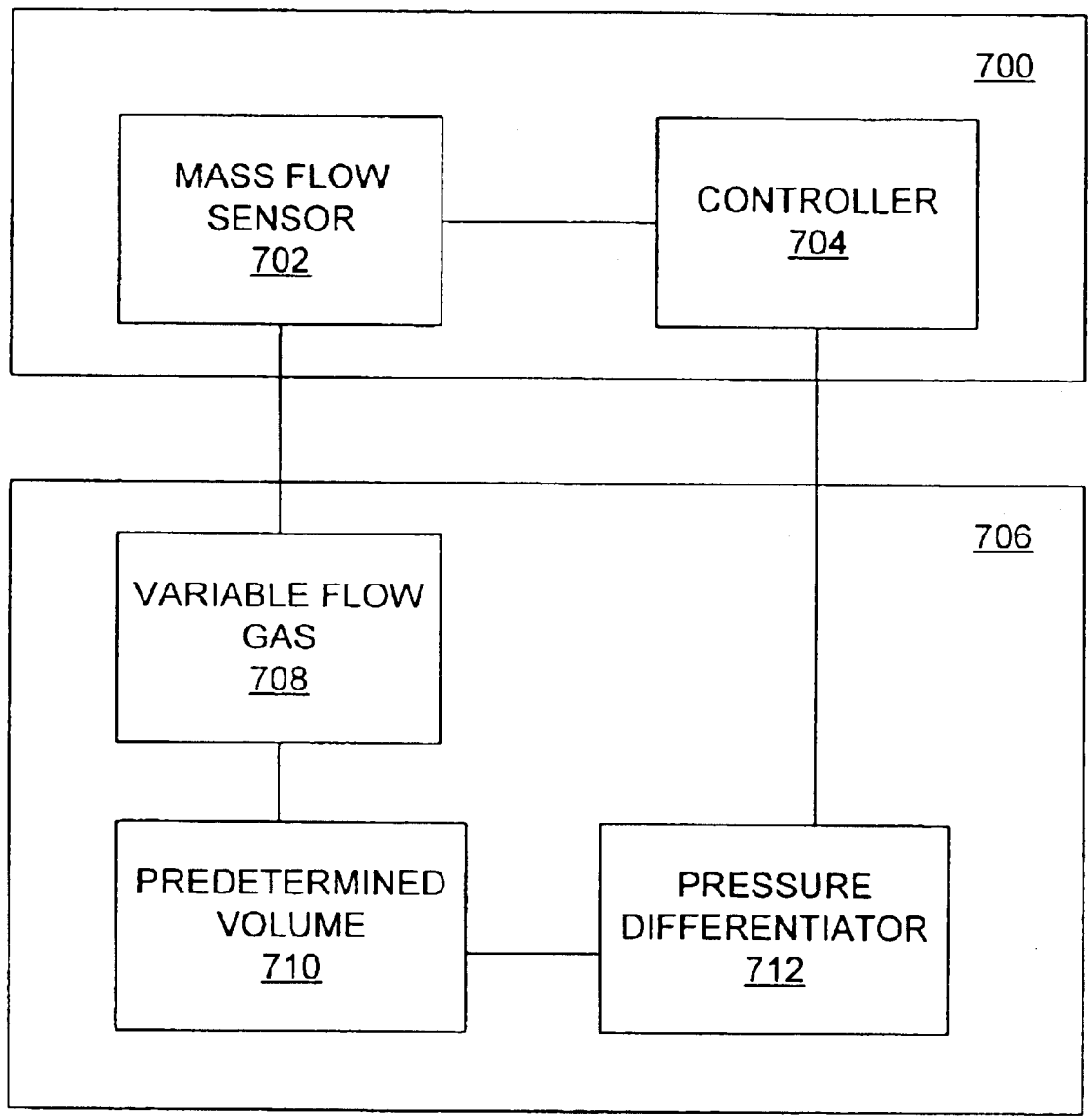
FIG. 7 is a conceptual block diagram of calibrator such as may be employed with a mass flow controller in accordance with the principles of the present invention.

A calibration method and apparatus in accordance with the principles of the present invention will be described in the discussion related to the conceptual block diagram of FIG. 7. This calibration system and method may be employed in a manufacturing setting, or, in an illustrative embodiment, may be incorporated into a self-calibrating mass flow controller. The mass flow controller 700 includes a mass flow sensor 702 and an electronic controller 704 that receives a flow signal from the mass flow sensor 702. A calibrator 706 includes a variable flow gas source 708, a receptacle of predetermined volume 710, and a pressure differentiator 712. It should be noted that the lines separating different functional blocks are somewhat fluid. That is, in different embodiments, the function associated with one block may be subsumed by one or more other blocks. For example, in an illustrative embodiment, the pressure differentiator 712 is implemented all, or in part, by the execution of code within the electronic controller 704. The variable flow gas source 708 provides a gas at proportional rates to both the receptacle of predetermined volume 710 and the mass flow sensor 702. The flow rate to the mass flow sensor 702 may be equal to the flow rate to the receptacle of predetermined volume 710: i.e., a proportionality constant of 1, for example. The mass flow sensor 702 is configured to produce a mass flow signal indicative of the flow that it senses and, in this illustrative embodiment, this signal is sent to the electronic controller 704. The pressure differentiator 712 produces a signal correlated to the flow from the variable flow source 708 into the receptacle of predetermined volume 710 according to the relationship of equation 4:

$$Qo = Qi - C1(V/T)(dP/dt) \qquad (4)$$

where:

Qo=the outlet flow rate in standard cubic centimeters per minute,

Qi=the inlet flow rate in standard cubic centimeters per minute,

C1=a normalizing constant relating the temperature and pressure to standard temperature and pressure V=the predetermined volume of the receptacle in liters, T=the Kelvin temperature of the fluid within the receptacle, dP/dt=time rate of change of pressure within the receptacle in Torr/second.

In an illustrative embodiment, the receptacle is closed and gas flows into the receptacle until the pressure within the receptacle equals that of gas supplied by the variable flow source 708. In such an illustrative embodiment, the variable flow source may be a constant-pressure source that, as pressure within the receptacle builds, supplies gas at an exponentially decreasing flow rate. In such a case, the outlet flow Qo=0, and the inlet flow, Qi is given by:

$$Qi = C1(V/T)(dP/dt) \quad (5)$$

The pressure differentiator 712 takes the time derivative of the pressure within the receptacle 710 and, given the normalizing constant C1, the predetermined volume V, and the gas temperature within the receptacle, the differentiator (and/or the electronic controller 704) may determine the actual flow into the receptacle 710. Because the flow into the receptacle is proportional to the flow into the thermal mass flow sensor 702, the actual flow into the thermal mass flow sensor 702 may also be determined by a multiplying the actual flow into the receptacle by a proportionality constant (e.g., the proportionality constant is 1 if the flows are equal). The signal from the mass flow sensor is then correlated, by the electronic controller 704 for example, to the actual flow, determined as just described. Such correlation relates one or more signal levels from the mass flow sensor to the actual flows. The pressure differentiator 712 may include analog differentiator circuitry, for example, that takes the time derivative of the pressure signal. The differentiator output signal, a signal representative of the time derivative of the pressure within the receptacle dP/dt, may be sampled by an analog-to-digital converter (not shown) to permit the electronic controller 704, which may include a microprocessor, DSP chip, or dual processors, for example to operate on the time derivative signal. Alternatively, the pressure differentiator 712 may convert the pressure signal to digital form for processing by the electronic controller 704, which takes the time derivative of the pressure signal. In such an embodiment, the electronic controller 704, in combination with differentiator code, operates as the differentiator. The electronic controller 704 employs at least two pressure differences divided by corresponding time intervals to compute the derivative. The gas may be supplied in parallel to the receptacle and mass flow sensor 702, or it may be supplied in series, as will be described in greater detail in the following discussion related to a self-calibrating mass flow controller.

In operation, a mass flow controller may be calibrated as just described, using a plurality of gases, with the correlation values (mappings of sensor output to actual flow) stored in tables. Calibration coefficients, relating flow measurements of one gas to another may also be developed and stored. The tables and/or coefficients may be downloaded to a mass flow controller in the field for use by the controller in controlling the flow of a gas. Various known interpolation techniques, such as linear or polynomial interpolation may be employed in conjunction with the calibration tables and/or coefficients. Additionally, such stored calibration tables and/or coefficients may be used as default values in a self-calibrating mass flow controller in accordance with the principles of the present invention. A self-calibrating mass flow controller in accordance with the principles of the present invention includes a calibrator 706 and a mass flow sensor 702 which may be employed to calibrate the mass flow controller in a manner as just described. In the case of a self-calibrating mass flow controller, though, the calibration can be performed, In Situ, in the field just as readily as in a manufacturing setting.

Once installed in the field, on a semiconductor processing tool as in the system 100 of FIG. 1, for example, the mass flow controller can calibrate itself using the gas that is to be used during the semiconductor processing. By using the gas that is to be used in processing, the mass flow controller may provide a more accurate flow measurement, because it will automatically accommodate variations, such as moisture content, for example. Additionally, a new processing gas may be used just as readily as a conventional gas, since the self-calibrating mass flow controller may calibrate itself (that is, correlate mass flow signal levels to actual flow levels determined by the pressure differentiator), on the gas to be used, not in relation to another, standard gas, such as $N_2$. Because the mass flow controller is calibrated in the orientation in which it will be used, discrepancies due to re-orientation of the mass flow controller in the field relative to the position in which it was calibrated during manufacturing will be substantially eliminated. All the mass flow controllers within a system such as system 100 of FIG. 1 may be calibrated automatically and simultaneously, within moments. This is in contrast to the cumbersome, painstaking process employed for conventional mass flow controllers, which are typically individually calibrated by a technician employing multiple mass flow meters, going from mass flow controller to mass flow controller. As will be described in greater detail in the description related to the discussion of FIG. 8, a mass flow controller that includes a thermal mass flow sensor and a pressure transducer may shut its outlet valve to create a varying gas flow into it's dead volume. By taking the time derivative of the pressure, the actual flow into the dead volume receptacle may be determined. The mass flow controller's correlation of the actual value of the flow to the thermal mass flow sensor signal acts as the mass flow controller's calibration.

Figure 8:
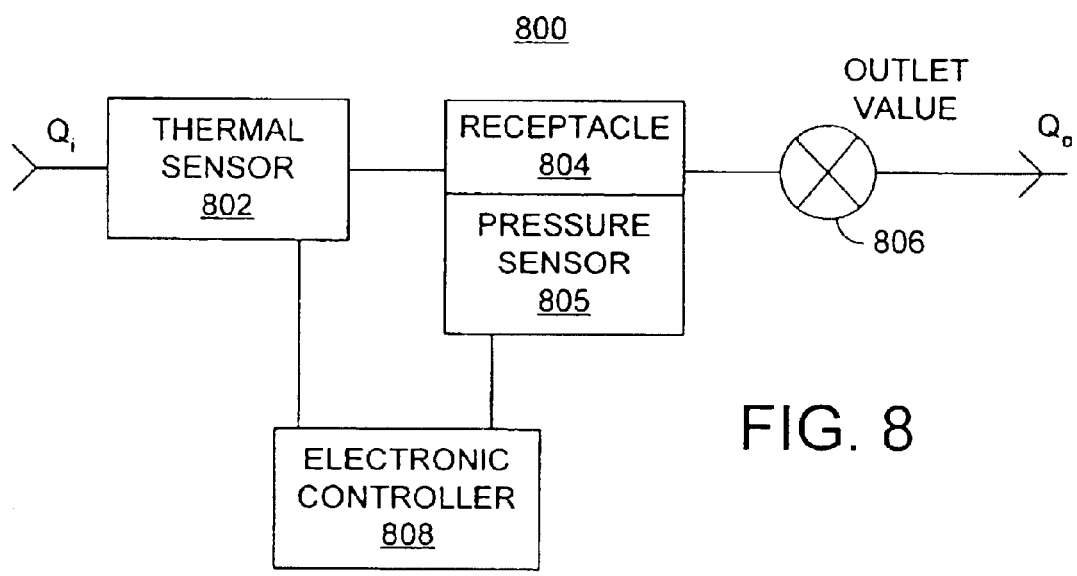
FIG. 8 is a block diagram of a self-calibrating mass flow controller in accordance with the principles of the present invention.

FIG. 8 is a conceptual block diagram of a self-calibrating mass flow controller 800 in accordance with the principles of the present invention. In this illustrative, series-flow, embodiment1 a gas flows through a thermal sensor 802 into a receptacle of predetermined volume 804, then through an outlet valve 806. The outlet flow Qo would normally be a controlled flow into a chamber, such as a chamber within an integrated circuit processing tool. An electronic controller 808, which, in this illustrative embodiment, executes code to perform the differentiation required to obtain actual flow, as described in the discussion related to FIG. 7, is in communication with the thermal sensor 802, pressure sensor 805 and the outlet valve 806. In an illustrative process, the electronic controller 808 operates in conjunction with the outlet valve 806 to form a variable-flow gas supply. That is, the electronic controller shuts the outlet valve, which causes the flow to decrease exponentially. The pressure within the dead volume increases, and the electronic controller differentiates this signal a number of times in order to obtain actual flow readings to correlate to the mass flow sensor signal values over a relatively broad range of flows. Additionally, in order to extend the period of time during which the flow is varying and to obtain actual flow values for correlation with the thermal mass flow signal values over a broad range, the electronic controller may open the outlet valve to a fully open position before closing it.

Figure 9:
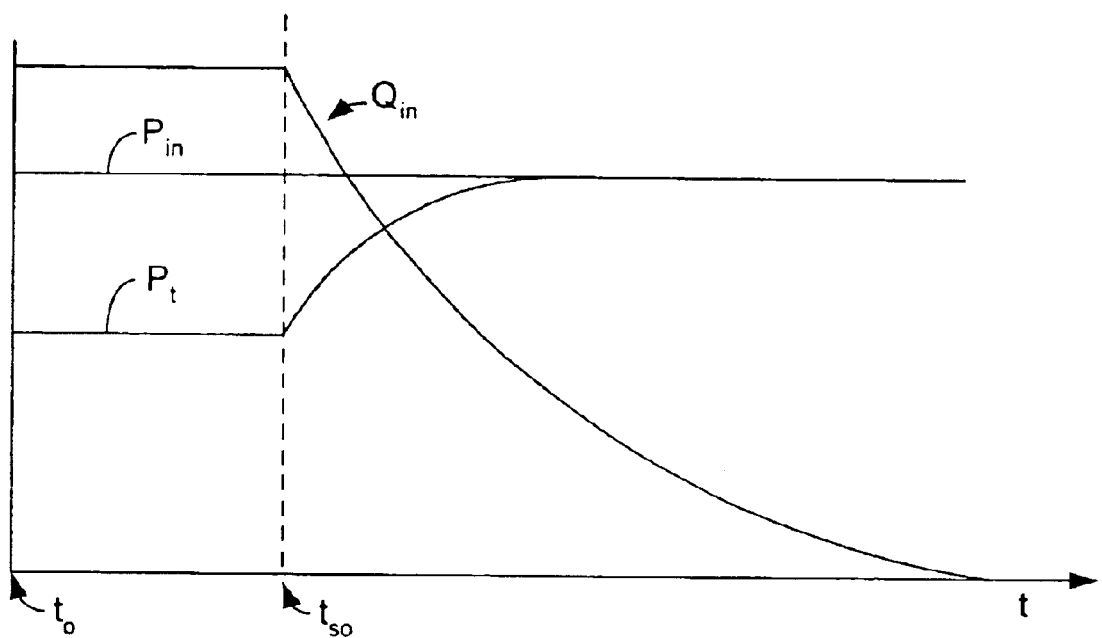
FIG. 9 is a graphical representation of flow and pressure curves corresponding to the process of calibrating a mass flow controller in accordance with the principles of the present invention.

The pressure and flow profiles associated with such a process are illustrated conceptually in the graph of FIG. 9. At an initial time $t_0$, the pressure difference between gas at the inlet to the mass flow controller Pin and the pressure Pr downstream in the receptacle 804 forces gas to flow through the mass flow controller at a rate Qin. In this example, the inlet pressure $P_{in}$, pressure within the receptacle $P_R$, and flow through the input of the mass flow controller are constant. At time $t_{so}$, the controller shuts the outlet valve, thereby reducing outlet flow Qo to zero. Gas continues to flow into the receptacle as long as there is a pressure difference between the receptacle and the inlet. As the pressure $P_r$ within the receptacle rises exponentially toward an equilibrium state of equality with the inlet pressure $P_{in}$, the inlet flow $Q_{in}$ decreases. By taking the derivative of the pressure change within the receptacle (also referred to herein as "dead volume" in association with an illustrative embodiment of the invention), the electronic controller may determine the actual flow into the receptacle, as previously described.

The electronic controller may correlate a plurality of simultaneous readings produced by the thermal mass flow sensor 802, to thereby calibrate the mass flow sensor 802. That is, once this process is completed for a specific gas, flow readings from the thermal mass flow sensor 802 may be correlated to actual flow rates. The results may be employed by the electronic controller 808 to control the opening of the valve 806 in a closed loop control system in order to deliver a selected flow downstream. In order to increase the period of time $t_{so}$ from when the controller shuts the valve, to the time at which the flow becomes undetectable, and to thereby increase the number and precision of pressure measurements that may be made, the controller may open the valve completely before shutting it at time $t_{so}$. Additionally, one or more flow restrictors may be placed in the flow path between the inlet to the thermal mass flow sensor 802 and the inlet to the receptacle 804.

Figure 10:
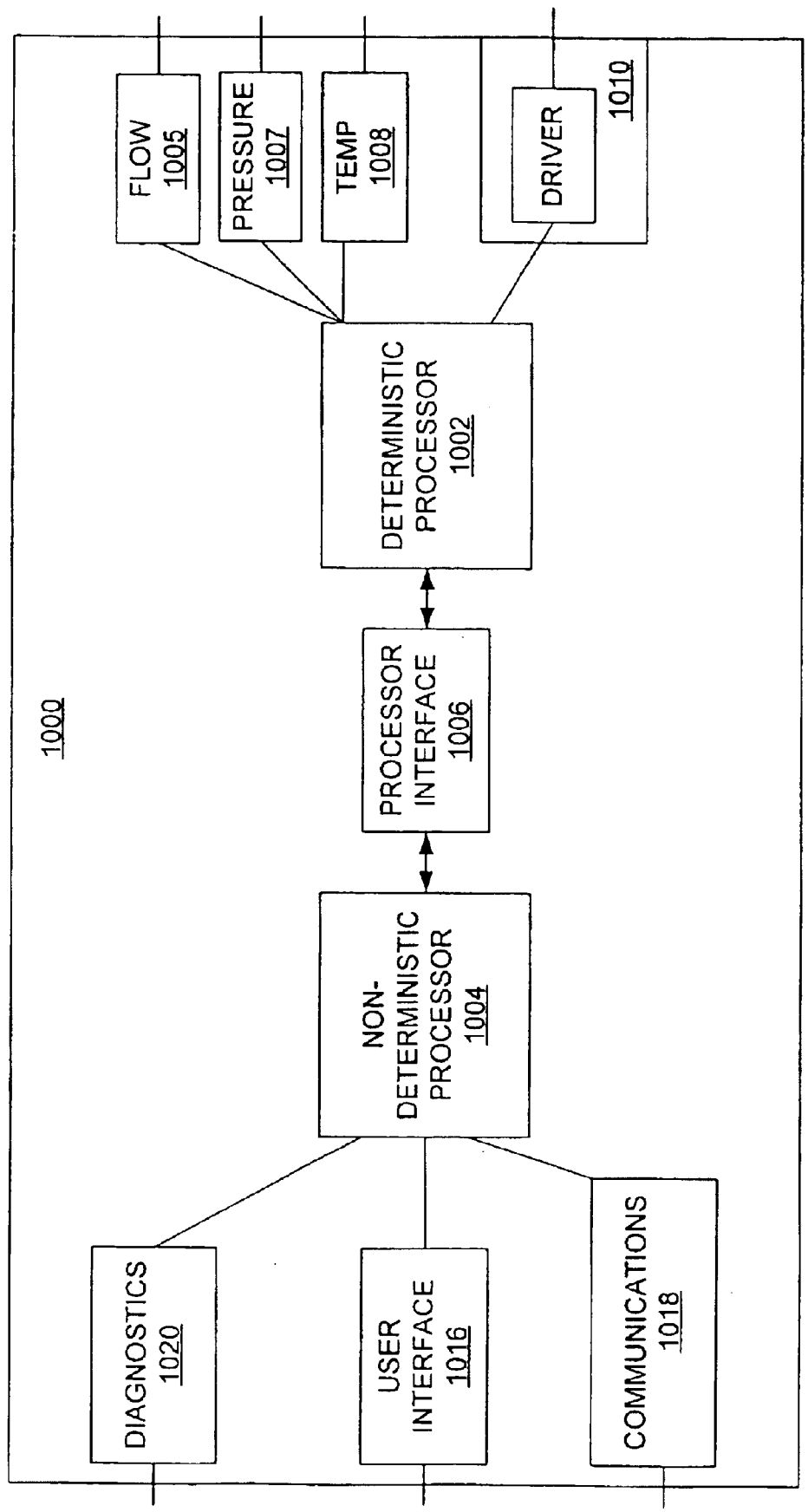
FIG. 10 is a conceptual block diagram of a dual processor configuration such as may be used in a mass flow controller in accordance with the principles of the present invention.

The conceptual block diagram of FIG. 10 illustrates the architecture of a dual-processor embodiment of an electronic controller 1000 such as may be used in a mass flow sensor in accordance with the principles of the present invention. In this illustrative embodiment, the controller includes two processors 1002, 1004. One of the processors 1002 is dedicated to "real time" processes and the other processor 1004 is dedicated to non-real time processes. By "real time" we mean processes that require a specified level of service within a bounded response time. In this sense, the processes are deterministic and the processor 1002 will be referred to herein as the deterministic processor. The objective of the dual processor architecture is to reduce the number of interrupts and manage asynchronous event responses in a predictable way. The non-deterministic processor 1004 may handle event-driven interrupts, such as responding to input from a user. The deterministic processor 1002 handles only frame-driven, that is, regularly scheduled, interrupts. In an illustrative embodiment, the non-deterministic processor 1004 is a general purpose processor, suited for a variety of tasks, such as user-interface, and other, miscellaneous tasks, rather than a specialized co-processor, such as a math- or communications-coprocessor. In particular, a TMS320VC5471, available from Texas Instruments, Inc., may be employed in a dual-processor embodiment in accordance with the principles. The TMS320VC5471 is described in a data manual, available at http://www-s.ti.com/sc/ds/tms320vc5471.pdf, which is hereby incorporated by reference.

A processor interface 1006 provides for inter-processor communications. The deterministic processor 1002, includes sensor and actuator interfaces. Among the sensor interfaces, a flow sensor interface 1005 operates in conjunction with a mass flow sensor to produce a digital representation of the rate of mass flow in an associated mass flow controller. One or more actuator interfaces 1010 are employed by the deterministic processor 1002 to control the opening of an associated mass flow controller's output control valve or drive a diagnostic test point, for example.

The actuator may be a current-driven solenoid or a voltage-driven piezo-electric actuator, for example. As will be described in greater detail in the discussion related to the flow chart of FIG. 9, after initialization, the deterministic processor 1002 loops through a control sequence, gathering sensor data, gathering setting information (for example, a desired mass flow setting), providing status information, and controlling the state of the outlet valve. Because non-deterministic tasks are offloaded to the non-deterministic processor 1004, the deterministic processor's control loop may be very compact. Consequently, control tasks may be executed within a minimal period of time and control readings and drive signals may be updated more frequently than possible if time were set aside for servicing non-deterministic tasks.

The controller 1000 operates in conjunction with a thermal mass flow sensor as generally described in the discussion related to FIG. 3 to produce a digital representation of the rate of mass flow into an associated mass flow controller. The digital representation may take the form of one or more data values and is subject to fluctuations due to pressure transients at the input of the mass flow sensor. The controller 1000, and more specifically, the deterministic processor 1002 may employ data obtained at the pressure sensor interface 1006 to compensate for fluctuations induced in the thermal mass flow sensor by pressure transients on the mass flow sensor inlet line. In this illustrative embodiment, the deterministic processor 1002 employs the temperature, pressure, and mass flow readings obtained from the respective 1008, 1007, and 1005 interfaces, to produce a compensated mass flow reading that more closely reflects the mass flow at the outlet of the mass flow sensor than a reading from the thermal mass flow sensor alone. The deterministic processor 1002 also provides control to sensors, as necessary, through thermal flow 1005, pressure 1007, and temperature 1008 sensor interfaces. The compensation process will be described in greater detail in the discussion related to FIG. 11. The deterministic processor 1002 also includes a valve actuator interface 1010, which the deterministic processor employs to control the position of a valve, such as the valve 220 of FIG. 2, to thereby control the rate of fluid flow through a mass flow controller, such as the mass flow controller 200, in a closed-loop control process.

The deterministic processor 1002 is devoted to the closed-loop valve control process, and, consequently, must be capable of operating with sufficient speed to read the various sensor outputs, compensate as necessary, and adjust the valve to produce a predetermined flow rate. The flow rate is predetermined in the sense that it is "desired" in some sense, and it need not be a static setting. That is, the predetermined flow rate may be set by an operator using a mechanical means, such as a dial setting, or may be downloaded from another controller, such as a workstation, for example, and updated frequently. Typically, gas flow control, and in this case, compensated gas flow control, requires relatively high-speed operation. Various types of processors, such as reduced instruction set (RISC), math coprocessor, or digital signal processors (DSPs) may be suitable for such high-speed operation. The computational, signal conditioning, and interfacing capabilities of a DSP make it particularly suitable for operation as the deterministic processor 1002. As will be described in greater detail in the description of the control process related to the discussion of FIG. 9, the function performed by the deterministic processor 1002 is deterministic in the sense that certain operations are completed in a timely and regular manner in order to avoid errors, and possible instabilities, in the control process. The deterministic 1002 and non-deterministic 1004 processors communicate via the inter-processor interface 1006 in a manner that does not impede the deterministic operation of the deterministic processor 1002.

The non-deterministic processor 1004 includes a local user interface 1016 that may be used with one or more input devices, such as a keypad, keyboard, mouse, trackball, joy stick, buttons, touch screens, dual inline packaged (DIP) or thumb-wheel switches, for example, to accept input from users, such as technicians who operate a mass flow controller associated with the non-deterministic processor 1004. The local user interface 1016 also includes one or more outputs suitable for driving one or more devices, such as a display, which may be a character, alphanumeric, or graphic display, for example, indicator light, or audio output device used to communicate information from a mass flow controller to a user. A communications interface 1018 permits a mass flow controller to communicate with one or more other instruments, and/or with a local controller, such as a workstation that controls a tool that employs a plurality of mass flow controllers and/or other devices in the production of integrated circuits, for example. In this illustrative example, the communications interface 1018 includes a DeviceNet interface. A diagnostic interface 1020 provides an interface for a technician to run diagnostics, as previously described in relation to the diagnostic interface 422 of FIG. 4. In an illustrative embodiment, the diagnostic interface includes an Ethernet interface and a web server.

The compactness of code for the deterministic processor 1002 permits the deterministic processor to be highly responsive to input changes and to quickly modify actuator signals in response to those changes. This partitioning of operations between deterministic and non-deterministic processors also eases the initial development of code, for both the deterministic and non-deterministic processors. For example, the deterministic code needn't respond to unscheduled events, such as "mirroring" a user's requests on a display at a user interface, and the non-deterministic code needn't break away from providing such user feedback in order to adjust an outlet valve control setting every fifty bus cycles. The partitioning between deterministic and non-deterministic also permits relatively simple revisions and upgrades. If the code for one processor must be revised or upgraded, the code for the other may require no revisions or only minor revisions. In particular, the code for the deterministic processor may be more "mature", or fixed than that for the non-deterministic processor; user interfaces, communications and other similar functions tend to be upgraded more frequently than the deterministic, mass flow control, functions.

Using this illustrative dual-processor embodiment, a user interface may be updated without any impact on the control function code, for example. Revision and maintenance of mixed-mode code (deterministic and non-deterministic code) would be a much more complicated and costly proposition than code partitioned in a manner in accordance with the principles of the present invention. In an illustrative embodiment the dual-processor controller 1000 may by a hybrid processor that incorporates two processors on one integrates circuit. An integrated circuit such as the TMS320C5471 hybrid processor available from Texas Instruments may be employed as the dual processors in accordance with the principles of the present invention. The digital signal processing (DSP) subsystem of the chip, due to its math capabilities would be more suitable as the deterministic processor in such an application. The IC's dual-ported memory may be employed as the inter-processor interface, with the processors writing to and reading from memory locations set aside to act as "mail boxes" for the transfer of information, including data, commands, and command responses.

Such an inter-processor interface permits the deterministic processor to continue operating in a frame-driven mode while, at the same time, allowing the deterministic processor to play a role in diagnostics and calibration. Any request for sensor data from the non-deterministic processor may be picked up from the mailbox on one pass of the deterministic processor's control loop, with the readings deposited in the mailbox the very next time through the loop. Diagnostic outputs may be modified similarly. The deterministic processor may also operate in other, non-process oriented modes. For example, during a self-calibration process such as previously described, the deterministic processor would no longer operate to maintain a set flow through the mass flow controller. In such a mode the deterministic processor would be occupied by shutting the mass flow controller's outlet valve, taking a plurality of time derivatives of the pressure within the dead volume, computing the corresponding actual flow in the mass flow controller, and correlating the actual flow to the flow signal produced by a thermal mass flow sensor.

Figure 11:
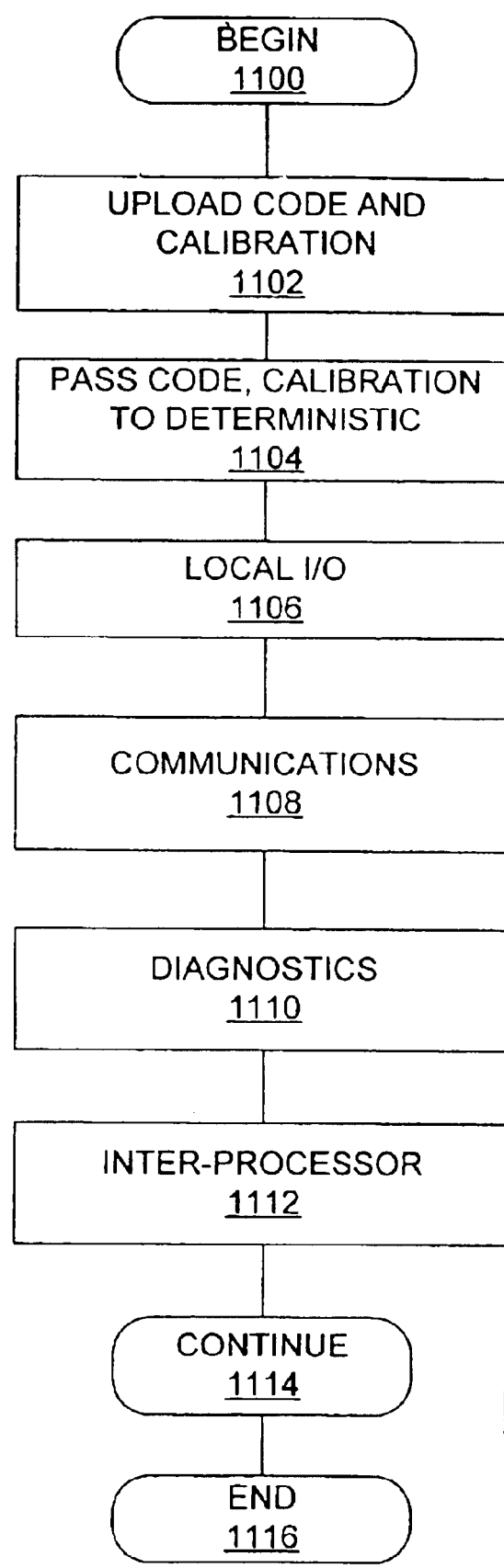
FIG. 11 is a flow chart of the general operation of a mass flow controller's non-deterministic processor in accordance with the principles of the present invention.

The flow chart of FIG. 11 outlines the process of sensing and controlling the flow of gas through a dual-processor mass flow controller in accordance with the principles of the present invention. The process begins in step 1100 and proceeds from there to step 1102 where the controller is initialized. This initialization step may include the uploading of calibration values or a calibration sequence itself. Additionally, operating code for both the deterministic and non-deterministic processors may be uploaded at this point. In an illustrative embodiment, the non-deterministic processor 1004 may upload its own code and begin operating, then upload code for the deterministic processor 1002. In the process of uploading code for the deterministic processor 1002, the non-deterministic processor 1004 may select among a plurality of executable code sets to upload to the deterministic processor, thereby tailoring the operation of the deterministic processor 1002. The non-deterministic processor 1004 may base this selection on switch settings, commands from a local controller (e.g., a workstation controlling the operation of a semiconductor process tool), or settings stored in non-volatile storage, for example. Such a selection permits a mass flow controller to be tailored to different flow control operations. For example, a technician may, by selecting among code sets, choose to operate the controller in a "pressure controller" mode rather than a "mass flow controller" mode, and this selection may be made locally or remotely (i.e., through a telecommunications link).

In step 1104 the non-deterministic processor 1004 passes operating code and initial control settings to the deterministic processor 1002 which then begins operating in a manner described generally in connection with the flow chart of FIG. 12. From step 1104, the process proceeds to step 1106 where the non-deterministic processor 1004 services the local input/out interface. Such servicing may include reading various inputs, including keyboard, switch, or mouse inputs, and displaying information locally, through LEDS, alphanumeric displays, or graphical displays. From step 1106 the process proceeds to step 1108 where the non-deterministic processor 1004 services the communications interface 1018. This servicing may include the steps of uploading control and sensor data to a workstation that operates as the local controller of a semiconductor process tool, for example. Additionally, the non-deterministic processor 1004 may download updated settings from the local controller.

From step 1108 the process proceeds to step 1110 where the non-deterministic processor 1004 services the diagnostic interface 1020. Various diagnostic operations, such as set forth in the description related to the discussion of FIG. 4, may be performed in this step. In an illustrative embodiment, the mass flow controller includes a web server, which permits an operator to run diagnostics through a network such as the "world wide web." From step 1110 the process proceeds to step 1112 where the non-deterministic processor 1004 services the inter-processor interface 1006. During "normal", non-diagnostic operation, the non-deterministic processor 1004 obtains readings from the deterministic processor 1002 and passes control information, such as a flow setting obtained through the communications interface 1018, to the deterministic processor 1002. From step 1112, the process proceeds to continue the processes just set forth in step 1114. The process proceeds to end in step 1116 when the mass flow controller is turned off, for example.

As previously noted, the steps set forth in this and other flow charts herein need not be sequential and, in fact, a number of functions performed by the non-deterministic processor 1004 may be event-interrupt-driven and no predictable sequence may be ascribed to the non-deterministic processor's operation. Other processes, such as data-logging may be performed at regular intervals. The non-deterministic processor 1004 can support a two-way socket connection to the deterministic processor 1002 through an Ethernet network interface, for example, to provide a relatively direct connection between a remote user and the deterministic processor 1002.

Figure 12A:
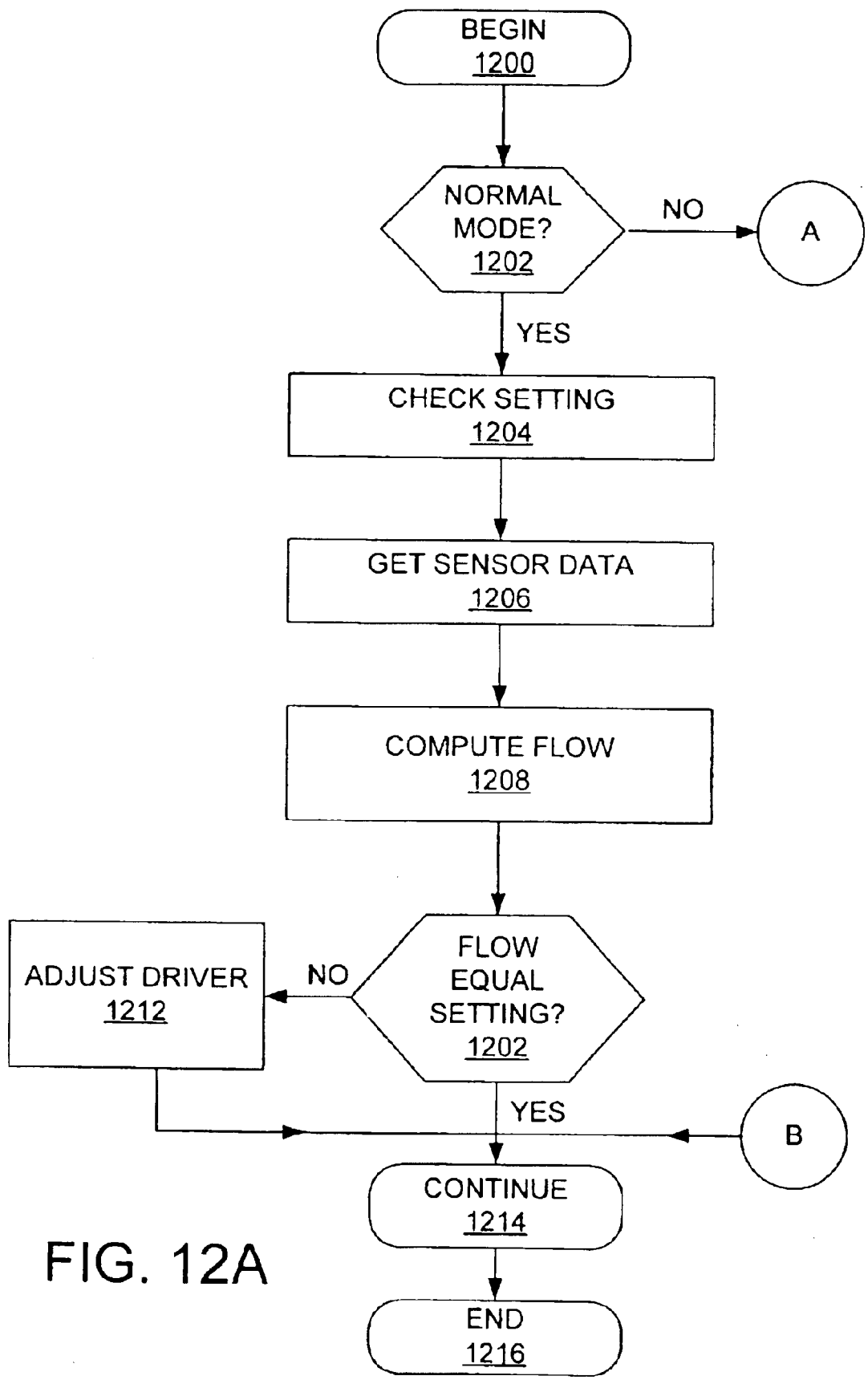
FIGS. 12A and 12B are flow charts of the general operation of a mass flow controller's deterministic processor in accordance with the principles of the present invention.
Figure 12B:
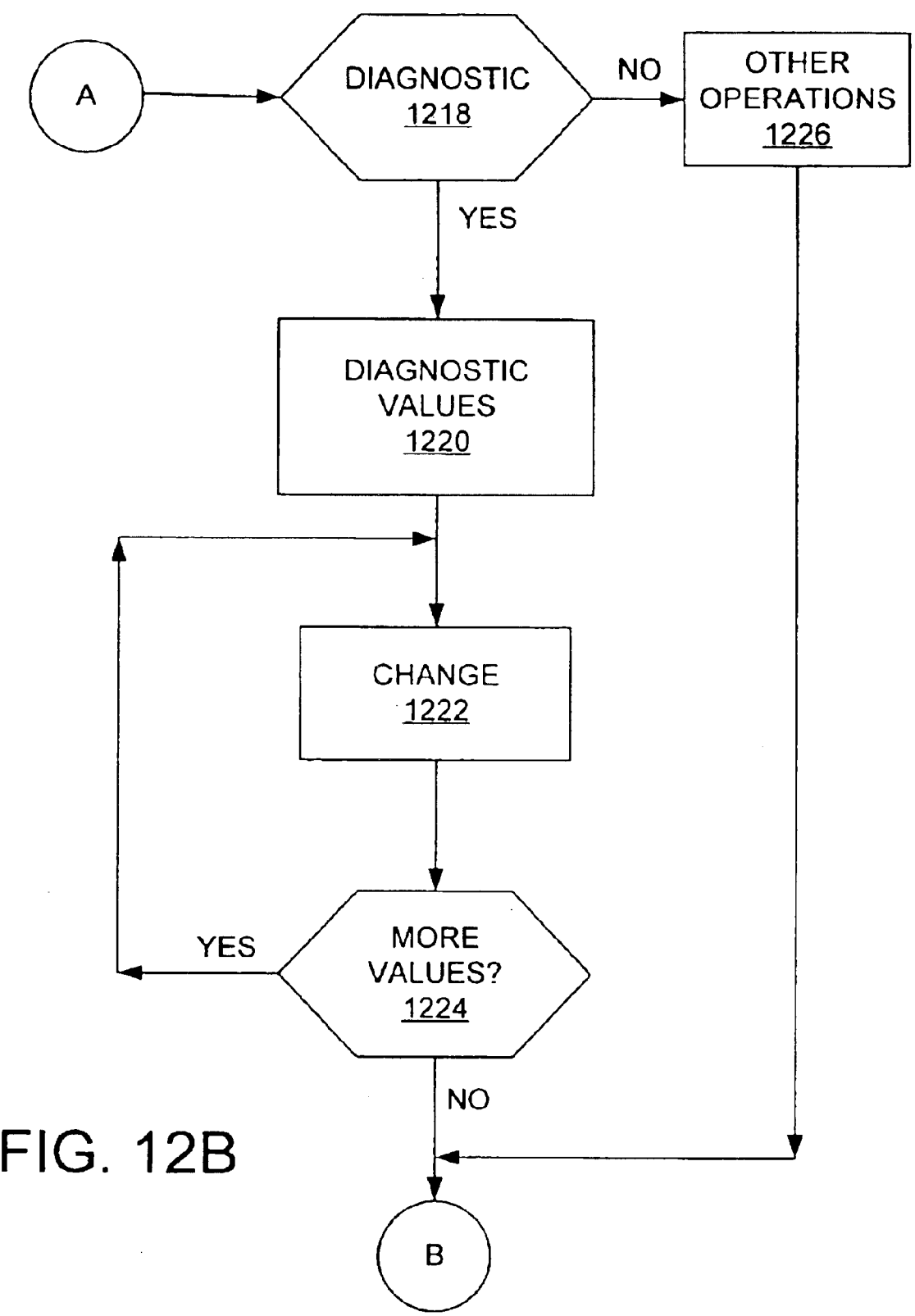

The flow chart of FIGS. 12A–12B depicts the operation of the deterministic processor 1002 of a dual processor mass flow controller in accordance with the principles of the present invention. In the context of this flow chart, it is assumed that an initialization process has taken place and that the deterministic processor 1002 is cycling through its control loop. The process begins in step 1200, FIG. 12A, and proceeds from there to step 1202 where the deterministic processor determines whether it is to operate in its "normal" control capacity or whether it is to operate in an alternative mode, such as a manual diagnostic mode or an automatic diagnostic mode, for example. The deterministic processor 1002 bases this decision on information it obtains from the inter-processor interface 1006. The deterministic processor 1002 services frame-driven, rather than event-driven interrupts; consequently, it regularly polls the inter-processor interface 1006 to obtain information such as this.

If the deterministic processor is to operate in its normal mode, the process proceeds from step 1202 to step 1204, where the deterministic processor obtains information from the inter-processor interface regarding the desired control settings. This information may be in the form of a desired flow rate received from a local controller, from a front panel user interface, or through the diagnostic port 1020 for example. The deterministic processor may also transfer information, such as sensor data, for example, to the non-deterministic processor through the inter-processor interface during this step. From step 1204 the process proceeds to step 1206 where the deterministic processor gathers data, from a variety or sensors for example. The sensors from which the deterministic processor obtains data may include a mass flow sensor (thermal or other type), a temperature sensor, or a pressure sensor, for example.

From step 1206 the process proceeds to step 1208, where the deterministic processor 1002 computes the flow rate of material through the mass flow controller. In an illustrative embodiment, the mass flow controller includes a thermal mass flow sensor and a pressure sensor configured to measure the pressure within the dead volume between the thermal mass flow sensor's bypass and the mass flow controller outlet valve. In this embodiment, the deterministic processor may employ the method described in relation to the discussion of FIG. 5 to compensate a flow rate measured by a thermal mass flow sensor at the inlet of the controller to more closely approximate the flow rate at the outlet of the controller. In an embodiment in which the flow rate obtained from the sensor is not compensated, the process would proceed directly from step 1206 to step 1210, skipping the computational process of step 1208.

In step 1210 the deterministic processor 1002 determines whether the flow rate computed in step 1208 (or read in step 1206) is equal to the desired flow rate indicated by the setting information obtained from the non-deterministic processor 1004 via the inter-processor interface 1006 in step 1204. If the values are equal, the deterministic processor continues the operation as just described, as indicated by the "continue" block 1214 (i.e., the deterministic processor returns to step 1202 and continues to cycle through the loop). If the values are not equal, the deterministic processor computes an error signal and employs the error signal to adjust the drive signal to the mass flow controller's outlet valve at step 1212. From step 1212 the process proceeds to continue in step 1214. The process proceeds from step 1214 to end in step 1216 when the mass flow controller is shut down or reset, for example.

If, in step 1202 the deterministic processor concludes that it is not to operate in the normal mode, the process proceeds through connecting box A to step 1218, FIG. 12B, where the deterministic processor 1002 determines whether it is to operate in a diagnostic mode. The deterministic processor 1002 may obtain this information from the inter-processor interface 1006. If the deterministic processor is to operate in a diagnostic mode, the process proceeds to step 1220. In step 1220 the deterministic processor determines which diagnostic mode it is to operate in. Once again, this information may be passed to the deterministic processor through the inter-processor interface. In an "automatic" mode, the deterministic processor acquires a sequence of diagnostic values from the inter-processor interface. The sequence of values is available at the interface for acquisition by the deterministic processor. The diagnostic values may be control outputs, for setting the opening of the mass flow controller outlet valve or for setting test point drive values, for example, or the diagnostic values may indicate desired sensor readings or readings from test points, for example. The diagnostic values may also indicate the sequence in which the values are to be employed, in order to set test point driver values, then read test point outputs, for example. In a manual mode, diagnostic values are made available to the deterministic processor through the inter-processor interface one at a time. In an embodiment in which the mass flow controller includes a web server, a technician may use a web-enabled workstation to contact the server in the mass flow controller. Once linked to the server, the technician may enter a valve setting command, by typing, selecting from a pull down menu or clicking on icon, for example. This single, setting, command would be received by the non-deterministic processor 1004 through its diagnostic port and passed to the deterministic processor 1002 through the inter-processor interface 1006.

In the manual diagnostic mode the deterministic processor executes through whatever diagnostic values are available at the inter-processor interface, then returns to it's normal control loop. This could "override" a single control loop cycle if, for example, a single diagnostic value, such as a test point drive value, is presented to the deterministic processor or, if a sequence of diagnostic values is presented to the deterministic processor, a number of control loop cycles may be overridden. In the automatic diagnostic mode a number of diagnostic values may be exchanged through the inter-processor interface in a period corresponding to a few control loop cycles, with a substantial number, on the order of at lest ten times as many, control loop cycles intervening between automatic diagnostic exchanges. Diagnostic modes may be combined, for example, to produce an automatic active on-line diagnostic mode, for example. In an illustrative embodiment, a mass flow controller in accordance with the principles of the present invention operates on a one-millisecond control loop cycle, during which it provides one percent of full-scale accuracy.

Keeping the various diagnostic modes in mind, and keeping in mind that processes illustrated through the use of flow charts may not be strictly linear processes and alternative flows may be implemented within the scope of the invention, the diagnostic process will be described generally in relation to steps 1220 through 1226. In step 1220 the deterministic processor acquires diagnostic values from the inter-processor interface. As previously noted, these values may be for the deterministic processor to use as control outputs or they may indicate data that is to be acquired by the deterministic processor, from a sensor, for example. From step 1220 the process proceeds to step 1222 where the deterministic processor 1002 processes the values acquired in step 1220, by changing an outlet valve actuator drive signal or transferring a sensor reading to the inter-processor interface, for example.

From step 1222 the process proceeds to step 1224 where the deterministic processor determines whether it has completed its diagnostic tasks. If it has not completed its diagnostic tasks, for example if it is operating in the automatic diagnostic mode and there are more values in a sequence of values to be retrieved from the inter-processor interface, the process returns to step 1222 and from there as previously described. If, in step 1224 the deterministic processor concludes that it has completed its diagnostic task, the process returns through connecting box B to step 1214 of FIG. 12A. If the deterministic processor determines that it is not to operate in a diagnostic mode, the process proceeds from step 1218 where processor performs functions such as routine background operations, then proceeds to return through connecting block B to step 1214 and from there as previously described.

Figure 6:
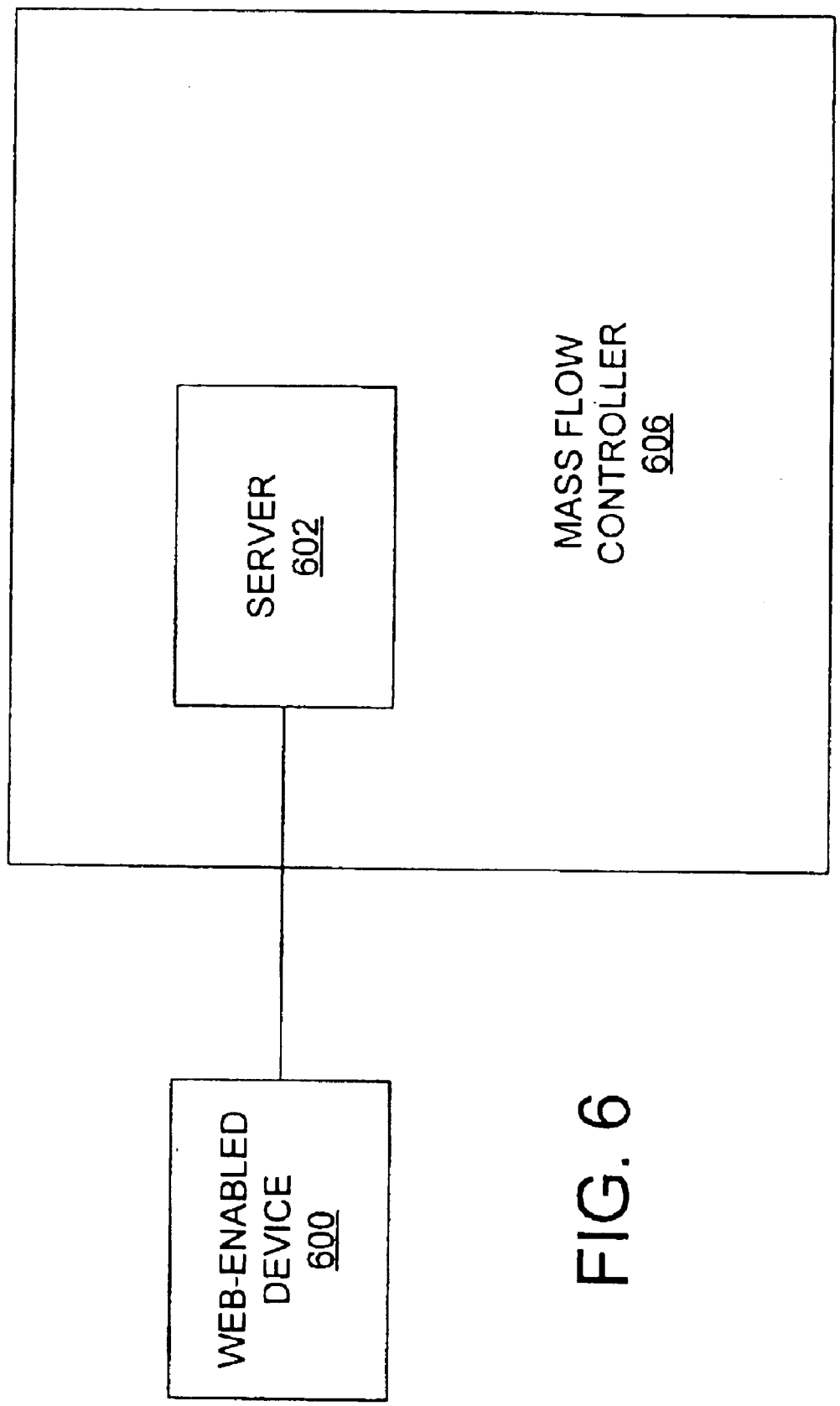
FIG. 6 is a conceptual block diagram of a web-enabled mass flow controller in accordance with the principles of the present invention.

The screen shots of FIGS. 13A through 13E illustrate a user interface such as may be made available for access to a mass flow controller in accordance with the principles of the present invention that includes a web server interface, such as the interface 608 of FIG. 6. In an illustrative embodiment the mass flow controller includes a web server, such as the server 602 of FIG. 6. A user may employ the server locally, through a local controller, or remotely, from a web-enabled device, such as the device 600 of FIG. 6. In this manner, the same user interface may be employed for both remote and local interactions with the mass flow controller. Detailed information regarding a mass flow controller, such as model number, range, and manufacturing setup parameters, may be displayed to a user and user-changeable setup parameters may be displayed as well. Different display techniques may be employed. If there are only a limited number of acceptable values, they may be displayed and chosen from a pulldown menu, for example. As previously described, a user, such as a technician can change set point values, open or close a valve, or monitor flow output, for example, through this interface. Additionally, while the mass flow controller is operating under a process control application, a user may induce the server to plot and log parameter values obtained from the mass flow controller.

Figure 13A:
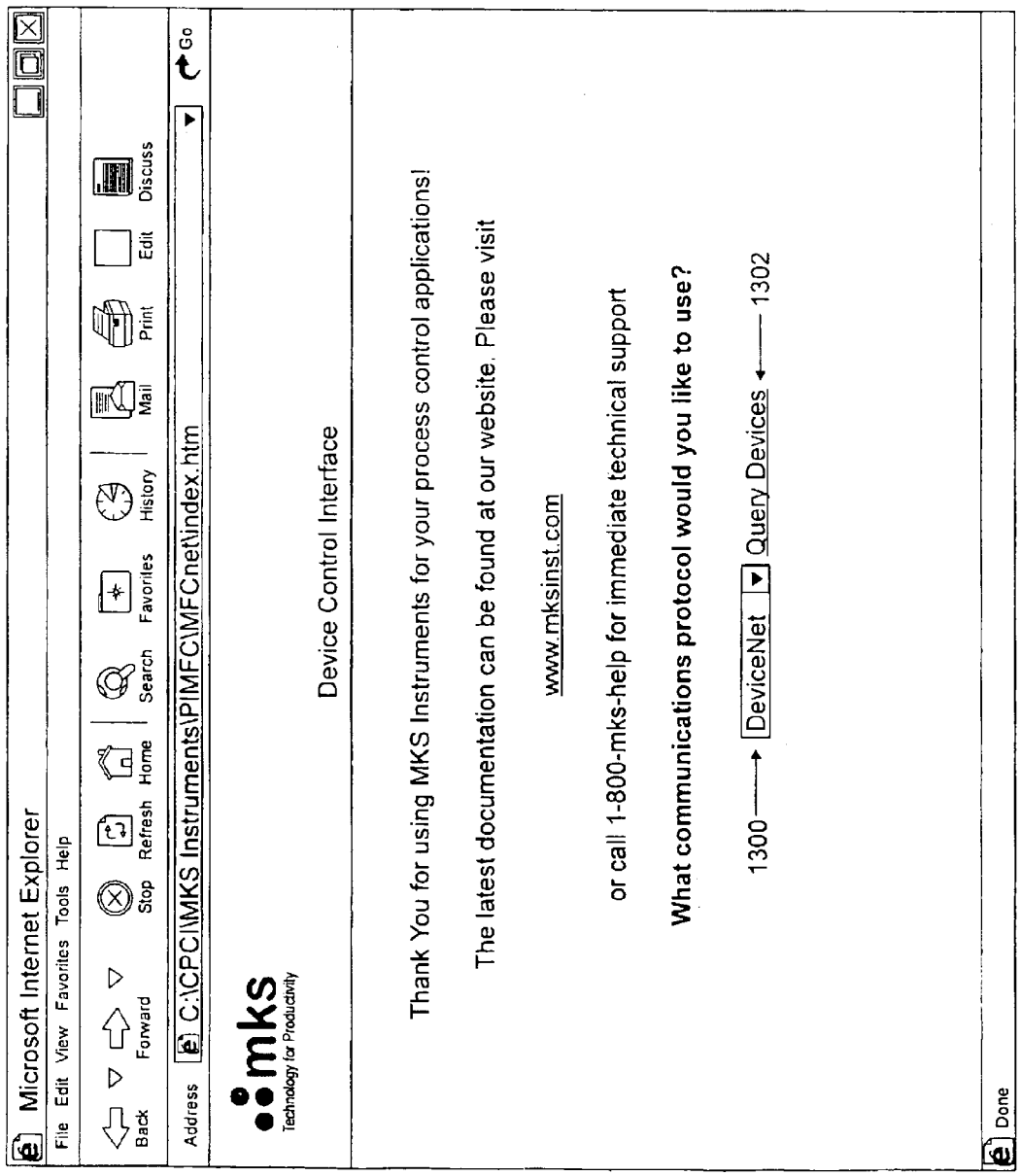
Figure 13B:
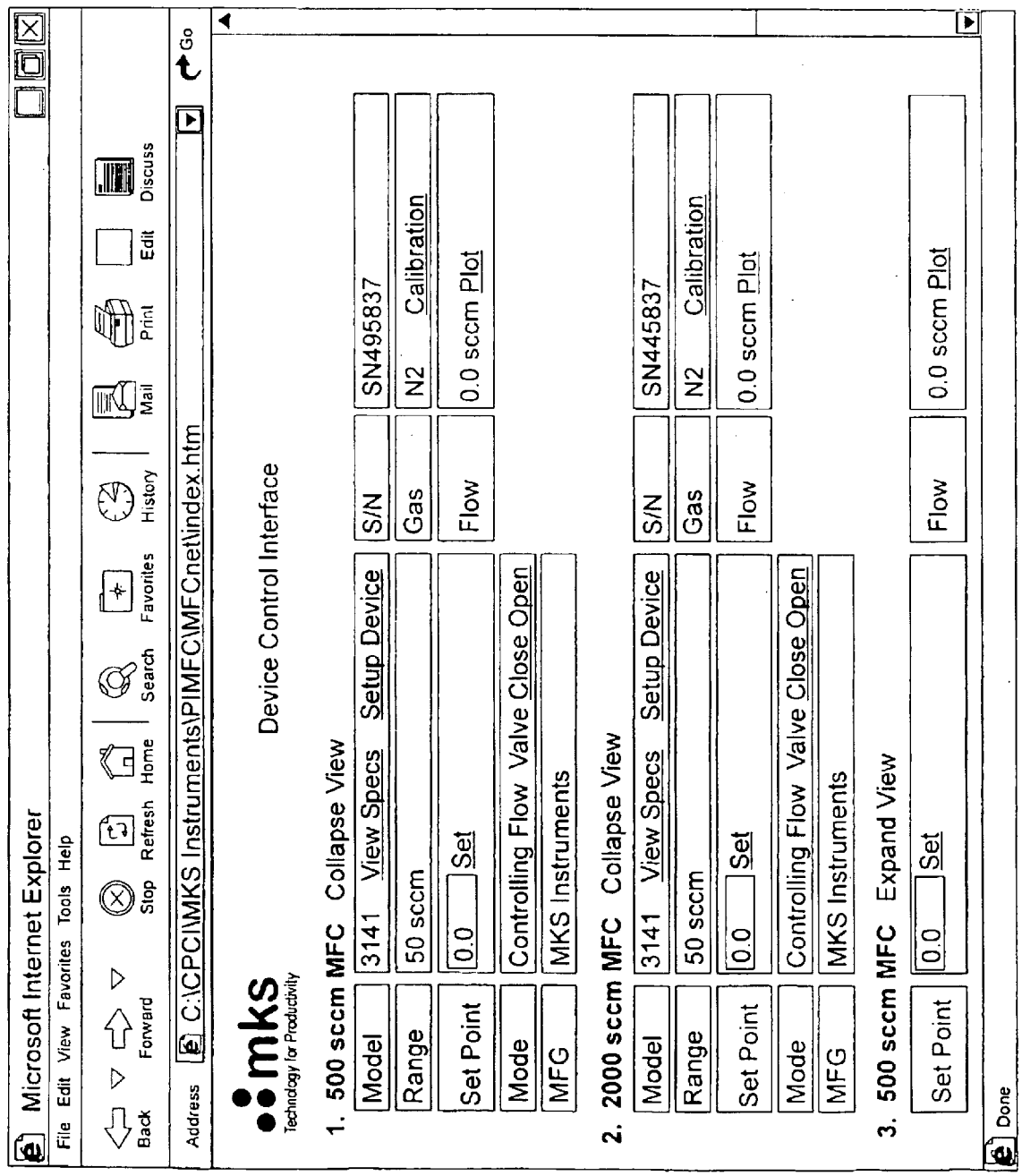

The screen shot of FIG. 13A illustrates the display a user may encounter when first accessing a mass flow controller in accordance with the principles of the present invention over the web. The display prompts the user to choose a communications protocol through use of the pulldown window 1300. The "query devices" link 1302 allows the user to initiate a process whereby his browser attempts to locate all devices that it recognizes.

Figure 13C:
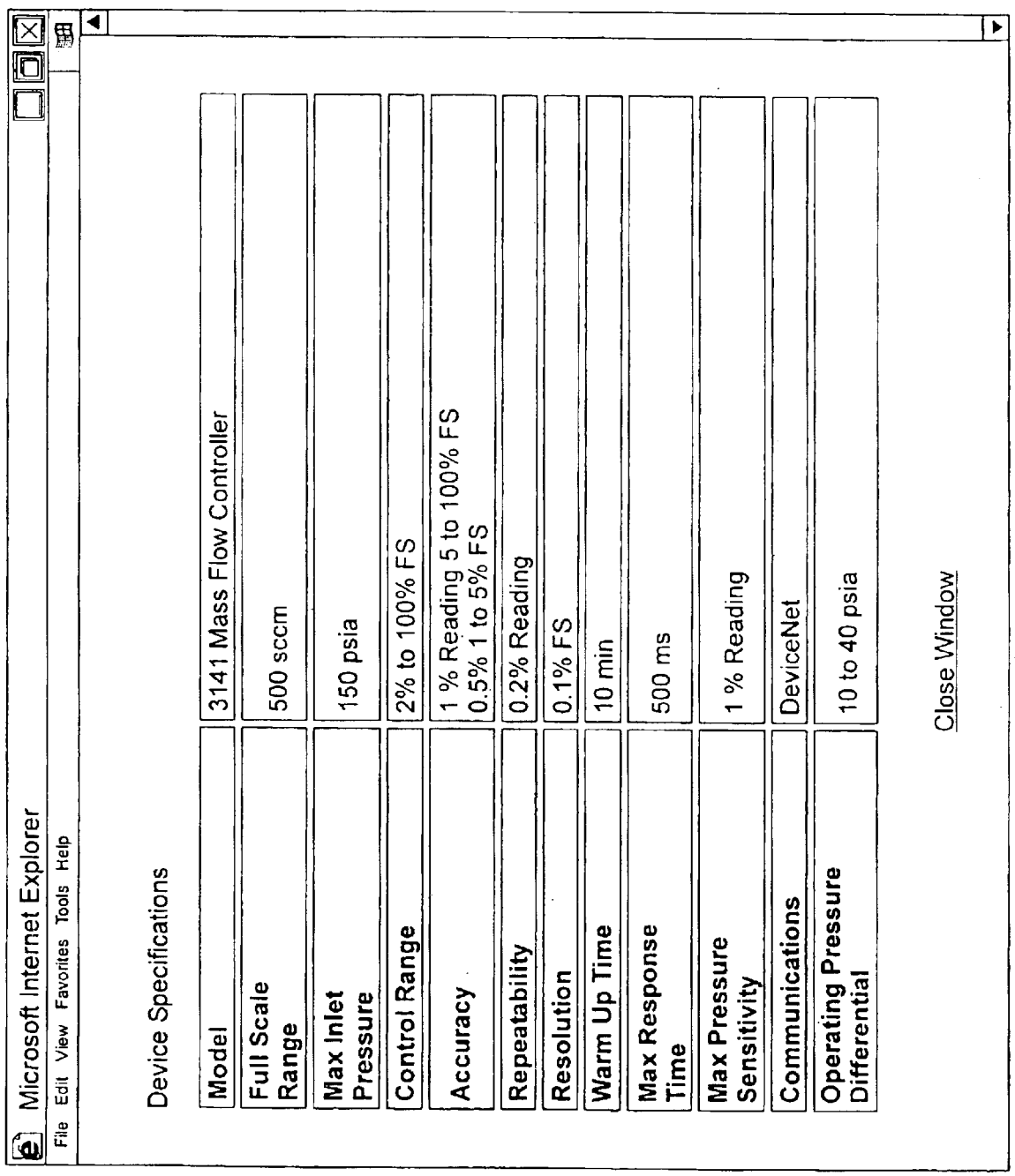
Figure 13D:
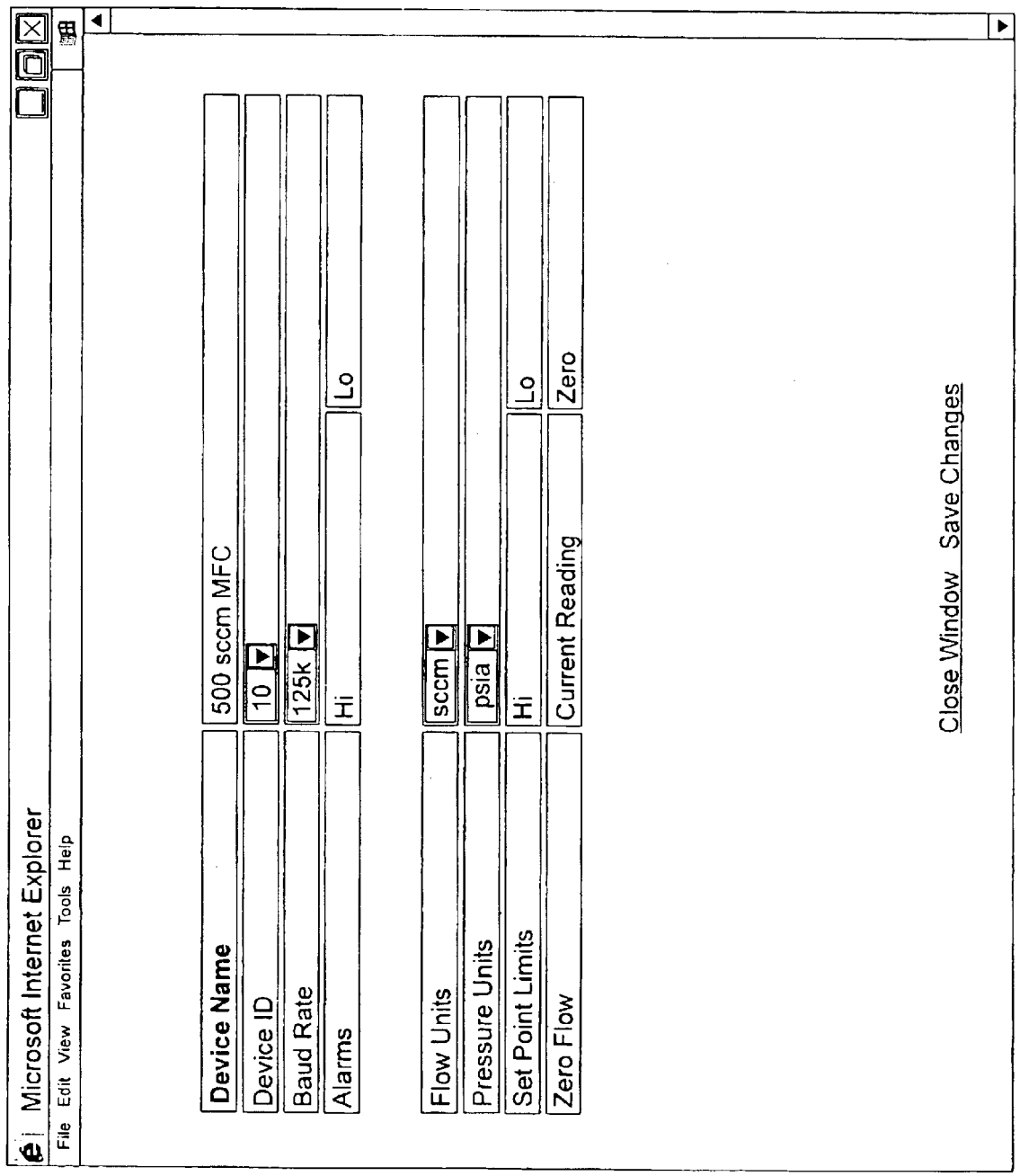

Basic information may be downloaded through the server. Information related to the mass flow controller are displayed in the screen of FIG. 13B. Such screens may be expanded or collapsed. A user may choose to view information related to a subset of the displayed mass flow controllers. Based on the model number, serial number and internally stored codes, product specifications for the mass flow controller are displayed along with user-selectable parameters, which may be displayed in a list, for example. A user may employ this screen to download calibration data to or from a mass flow controller and to enter calibration tables. A user may also alter set points through this interface and monitor the reported flow through the corresponding mass flow controller. Additionally, a user may override settings and open or close a mass flow controller's outlet control valve. Each mass flow controller's specifications may be viewed, as illustrated by the screen of FIG. 13C. Illustrative user-selectable parameters are displayed in the screen shot of FIG. 13D and calibration data such as a user may download from a mass flow controller is illustrated in the screen shot of FIG. 13E.

A software implementation of the above described embodiment(s) may comprise a series of computer instructions either fixed on a tangible medium, such as a computer readable media, e.g. diskette, CD-ROM, ROM, or fixed disc, or transmittable to a computer system, via a modem or other interface device, such as communications adapter connected to the network over a medium. Medium can be either a tangible medium, including but not limited to, optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be apparent to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A system for providing a constant flow of gas into a vacuum processing chamber irrespective of fluctuations in pressure of a supply gas, comprising:
   a mass flow controller comprising a mass flow sensor, including a sensor bypass, configured to sense the flow of the supply gas into an inlet of the controller, and a control valve for use in controlling the rate of flow of gas through an outlet of the valve;
   a pressures sensor configured to sense the gas pressure in a volume between the mass flow sensor bypass and the control valve; and
   an electronic controller configured to monitor the pressure sensed by said pressure sensor and to compensate the sensed inlet flow rate sensed by said mass flow sensor to thereby ensure substantially constant flow of gas from an outlet of the control valve irrespective of fluctuations in pressure of the supply gas.

2. The system of claim 1, wherein the mass flow sensor is a thermal mass flow sensor.

3. The system of claim 1, further comprising:
   a temperature sensor configured to sense the temperature of gas within the volume between the sensor bypass and the control valve and to provide a temperature signal indicative of the sensed temperature, wherein the electronic controller configured to employ the temperature signal in producing the substantially constant flow of gas from an outlet of the control valve.

4. The system of claim 3, wherein the temperature sensor is configured to sense the temperature of a wall that defines a portion of the volume between the sensor bypass and the control valve, wherein the temperature signal is a function of the sensed temperature.

5. The system of claim 4, wherein the electronic controller is configured to compute the time rate of change of pressure within the volume between the sensor bypass and the outlet control valve, and to use this time rate of change of pressure to produce the compensated measure of the rate of fluid flow out of the controller.

6. The system of claim 5, wherein the electronic controller is configured to compare the compensated measure of the rate of fluid flow out of the controller to a set value and to adjust the outlet control valve to minimize the difference between the set value and the compensated measure of the rate of fluid flow out of the controller so as to ensure substantially constant flow of gas from an outlet of the control valve irrespective of fluctuations in pressure of the supply gas.

7. The system of claim 5, wherein the electronic controller is configured to compensate the controller's sensed inlet flow rate by subtracting from the sensed inlet flow rate the product of: a normalized rate of pressure change within the volume between the sensor bypass and the control valve, a normalized temperature of the fluid within that volume, and the volume between the bypass sensor and the outlet control valve.

8. The system of claim 5, wherein the electronic controller is configured to compensate the controller's sensed inlet flow rate by subtracting from it the product of a constant, the volume between the sensor bypass and the outlet control valve, and the time rate of pressure change within the volume between the sensor bypass and the outlet control valve, divided by the temperature of the fluid within the volume.

9. A system for providing a constant flow of gas into a vacuum processing chamber irrespective of fluctuations in pressure of a supply gas, comprising:
   a mass flow controller configured to control the flow of the supply gas through the mass flow controller and defining a volume between a mass flow sensor bypass and a control valve;
   a pressure sensor configured to sense the gas pressure in the volume; and
   an electronic controller configured to monitor the pressure sensed by said pressure sensor and to compensate the sensed inlet flow rate sensed by said mass flow sensor to thereby ensure substantially constant flow of gas from an outlet of the control valve irrespective of fluctuations in pressure of the supply gas.

10. A method of providing a constant flow of gas into a vacuum processing chamber irrespective of fluctuations in pressure of a supply gas, comprising:
    sensing the flow of the supply gas through a mass flow controller comprising a mass flow sensor, including a sensor bypass, configured to sense the flow of the supply gas into an inlet of the controller, and controlling with a control valve the rate of flow of gas through an outlet of the valve;
    sensing with a pressures sensor the gas pressure in a volume between the mass flow sensor bypass and the control valve; and
    using an electronic controller to monitor the pressure sensed by said pressure sensor and to compensate the sensed inlet flow rate sensed by said mass flow sensor to thereby ensure substantially constant flow of gas from an outlet of the control valve irrespective of fluctuations in pressure of the supply gas.

11. The method of claim 10, wherein sensing the flow of supply gas includes sensing the flow of supply gas with a thermal mass flow sensor.

12. The method of claim 10, further comprising:
    sensing the temperature of gas within the volume between the sensor bypass and the control valve and providing a temperature signal indicative of the sensed temperature, and configuring the electronic controller so as to employ the temperature signal in producing the substantially constant flow of gas from an outlet of the control valve.

13. The method of claim 12, wherein sensing the temperature of gas within the volume includes sensing the temperature of a wall that defines a portion of the volume between the sensor bypass and the control valve, wherein the temperature signal is a function of the sensed temperature.

14. The method of claim 13, configuring the electronic controller includes configuring the electronic controller to compute the time rate of change of pressure within the volume between the sensor bypass and the outlet control valve, and using this time rate of change of pressure to produce the compensated measure of the rate of fluid flow out of the controller.

15. The method of claim 14, wherein configuring the electronic controller includes configuring the electronic controller to compare the compensated measure of the rate of fluid flow out of the controller to a set value and adjusting the control valve to minimize the difference between the set value and the compensated measure of the rate of fluid flow out of the controller so as to ensure substantially constant flow of gas from an outlet of the control valve irrespective of fluctuations in pressure of the supply gas.

16. The method of claim 14, wherein configuring the electronic controller includes configuring the controller so as to compensate the controller's sensed inlet flow rate by subtracting from the sensed inlet flow rate the product of: a normalized rate of pressure change within the volume between the sensor bypass and the control valve, a normalized temperature of the fluid within that volume, and the volume between the bypass sensor and the outlet control valve.

17. The method of claim 14, wherein configuring the electronic controller includes configuring the controller so as to compensate the controller's sensed inlet flow rate by subtracting from it the product of a constant, the volume between the sensor bypass and the outlet control valve, and the time rate of pressure change within the volume between the sensor bypass and the outlet control valve, divided by the temperature of the fluid within the volume.

18. A method of providing a constant flow of gas into a vacuum processing chamber irrespective of fluctuations in pressure of a supply gas, comprising:

configuring a mass flow controller so as to control the flow of the supply gas through the mass flow controller and define a volume between a mass flow sensor bypass and a control valve;

configuring a pressure sensor so as to sense the gas pressure in the volume; and configuring an electronic controller so as to monitor the pressure sensed by said pressure sensor and to compensate the sensed inlet flow rate sensed by said mass flow sensor to thereby ensure substantially constant flow of gas from an outlet of the control valve irrespective of fluctuations in pressure of the supply gas.

* * * * *